(12) United States Patent
Yamazaki

(10) Patent No.: US 7,097,270 B2
(45) Date of Patent: Aug. 29, 2006

(54) COLOR IMAGE FORMING APPARATUS AND METHOD FOR CONTROLLING COLOR IMAGE FORMING APPARATUS

(75) Inventor: Hiroyuki Yamazaki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 10/253,508

(22) Filed: Sep. 25, 2002

(65) Prior Publication Data

US 2003/0085941 A1    May 8, 2003

(30) Foreign Application Priority Data

Sep. 27, 2001  (JP)  ............ 2001-297068
Oct. 1, 2001   (JP)  ............ 2001-305247

(51) Int. Cl.
*B41J 29/393*   (2006.01)
(52) U.S. Cl. ............ 347/19; 347/43; 347/15
(58) Field of Classification Search ............ 347/19, 347/43, 15; 399/49, 39, 60, 40; 358/1.9
See application file for complete search history.

(56) References Cited

U.S. PATENT DOCUMENTS 5,486,901 A * 1/1996 Fukuchi et al. ............ 399/40
5,887,223 A * 3/1999 Sakai et al. ............ 399/60
5,963,756 A   10/1999 Sakai et al. ............ 399/39
6,185,386 B1  2/2001 Noguchi ............ 399/49
6,243,542 B1 * 6/2001 Fujimoto et al. ............ 399/49
6,450,606 B1 * 9/2002 Kato et al. ............ 347/19
2001/0033387 A1 * 10/2001 Nogiwa et al. ............ 358/1.9

FOREIGN PATENT DOCUMENTS

JP    2000-301808    * 10/2000

* cited by examiner

*Primary Examiner*—Manish S. Shah
*Assistant Examiner*—Lam S. Nguyen
(74) *Attorney, Agent, or Firm*—Fitzpatrick, Cella, Harper & Scinto

(57) ABSTRACT

The invention makes it possible to realize controlling of the density-gradation characteristics that is superior in that gray balance of tertiary color is taken into account as compared to conventional control of the density-gradation characteristics that uses only density sensor, in an individual color image forming apparatus. The density of an unfixed patch is detected before a fixing operation. The color of a fixed patch formed on a transferring material is also detected. Calibration tables for cyan, magenta, yellow and black for converting gradients in given image information into gradients matched with density-gradation characteristics of the color image forming apparatus are corrected based on results of the above-mentioned detections, thereby controlling density-gradation characteristics.

17 Claims, 30 Drawing Sheets

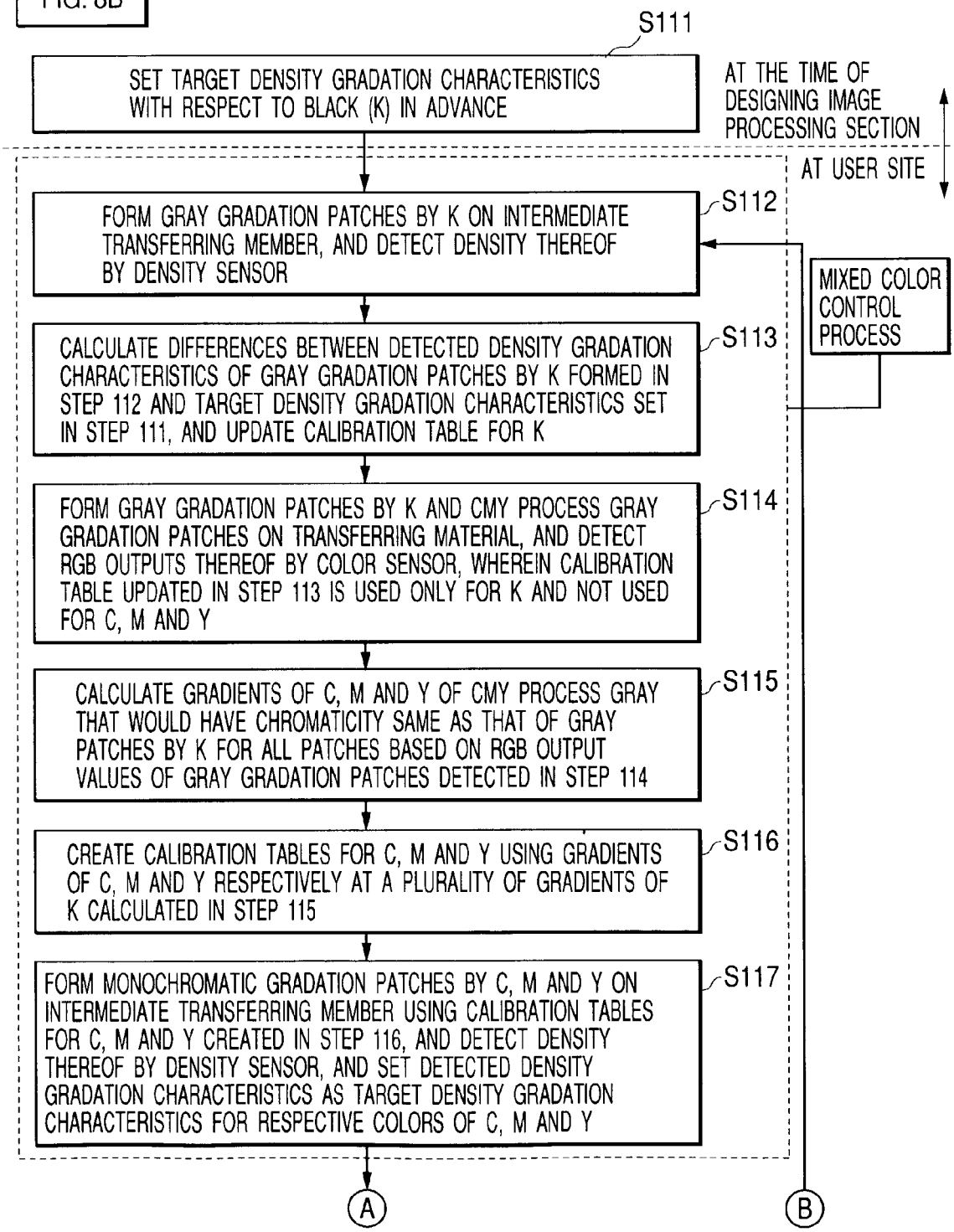

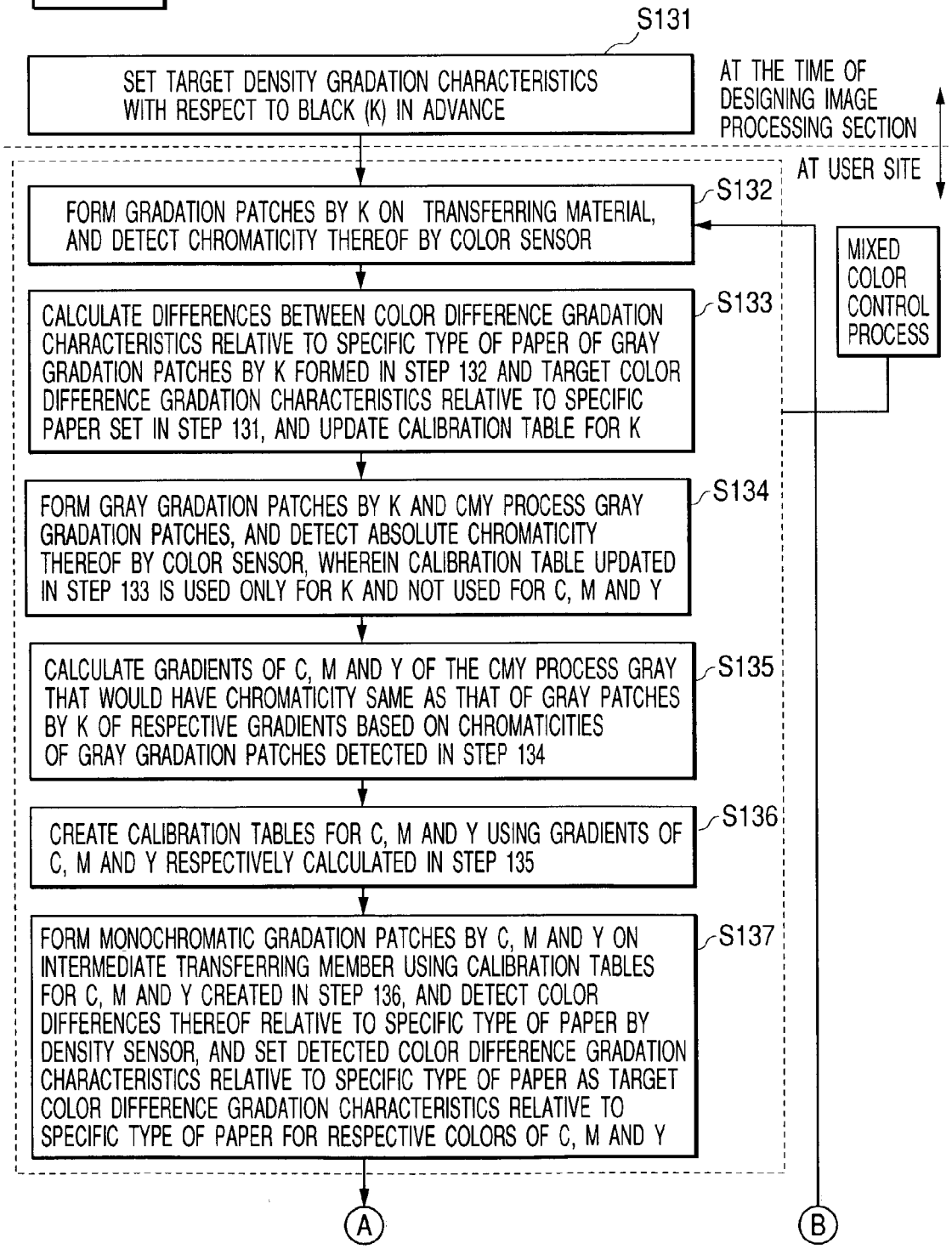

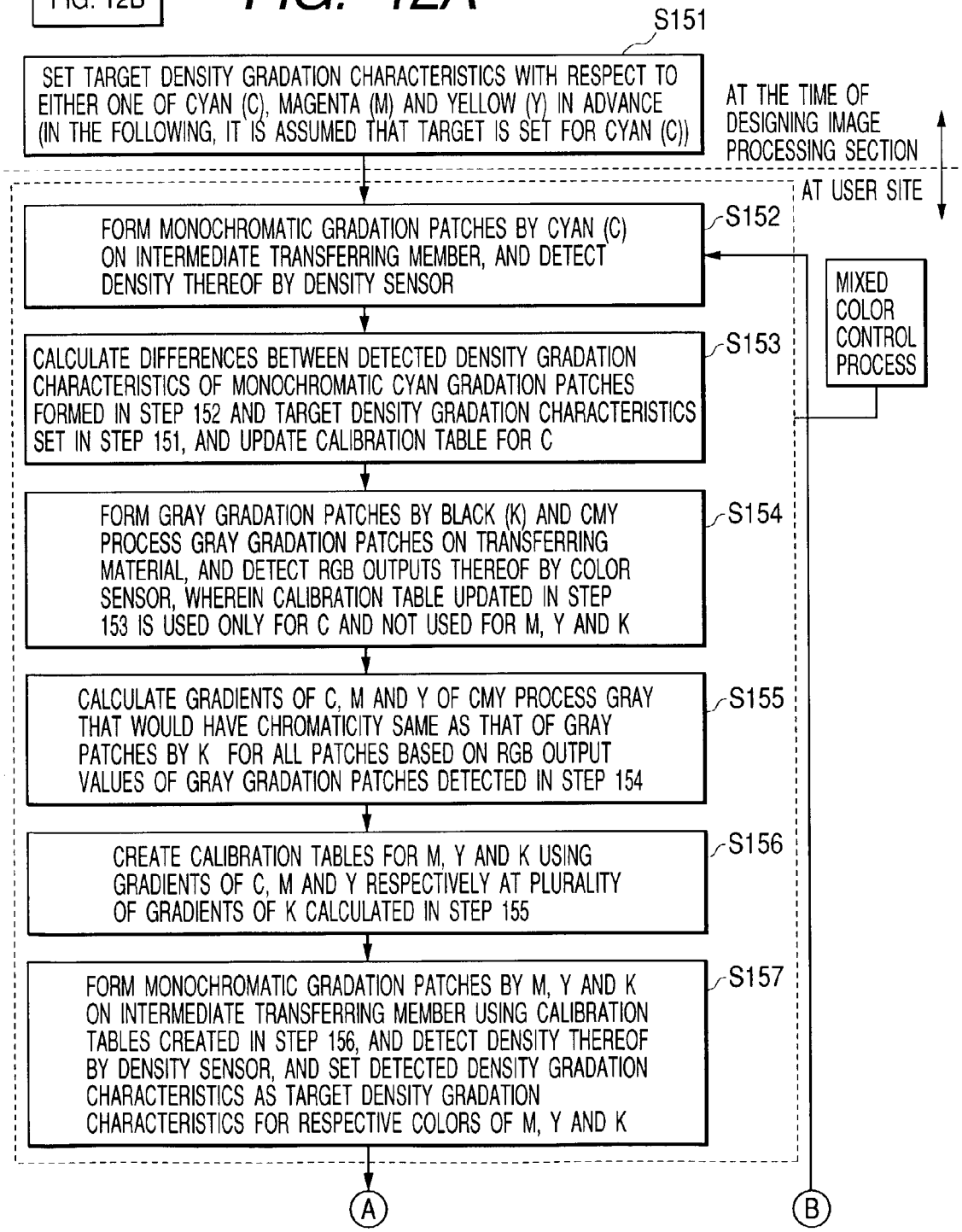

| PATCH No. | C GRADIENT | M GRADIENT | Y GRADIENT | K GRADIENT |
|---|---|---|---|---|
| (1) | C0−α | M0−α | Y0−α | 0 |
| (2) | C0+α | M0−α | Y0−α | 0 |
| (3) | C0−α | M0+α | Y0−α | 0 |
| (4) | C0−α | M0−α | Y0+α | 0 |
| (5) | C0+α | M0+α | Y0−α | 0 |
| (6) | C0+α | M0−α | Y0+α | 0 |
| (7) | C0−α | M0+α | Y0+α | 0 |
| (8) | C0+α | M0+α | Y0+α | 0 |
| (9) | 0 | 0 | 0 | K0 |

| PATCH No. | C GRADIENT | M GRADIENT | Y GRADIENT | K GRADIENT |
|---|---|---|---|---|
| (1) | $C0-\alpha$ | $M0$ | $Y0$ | 0 |
| (2) | $C0+\alpha$ | $M0$ | $Y0$ | 0 |
| (3) | $C0$ | $M0-\alpha$ | $Y0$ | 0 |
| (4) | $C0$ | $M0+\alpha$ | $Y0$ | 0 |
| (5) | $C0$ | $M0$ | $Y0-\alpha$ | 0 |
| (6) | $C0$ | $M0$ | $Y0+\alpha$ | 0 |
| (7) | 0 | 0 | 0 | $K0$ |

| PATCH No. | C GRADIENT | M GRADIENT | Y GRADIENT | K GRADIENT |
|---|---|---|---|---|
| (1) | $Cs-\alpha$ | $Ms-\alpha$ | $Ys-\alpha$ | 0 |
| (2) | $Cs+\alpha$ | $Ms-\alpha$ | $Ys-\alpha$ | 0 |
| (3) | $Cs-\alpha$ | $Ms+\alpha$ | $Ys-\alpha$ | 0 |
| (4) | $Cs-\alpha$ | $Ms-\alpha$ | $Ys+\alpha$ | 0 |
| (5) | $Cs+\alpha$ | $Ms+\alpha$ | $Ys-\alpha$ | 0 |
| (6) | $Cs+\alpha$ | $Ms-\alpha$ | $Ys+\alpha$ | 0 |
| (7) | $Cs-\alpha$ | $Ms+\alpha$ | $Ys+\alpha$ | 0 |
| (8) | $Cs+\alpha$ | $Ms+\alpha$ | $Ys+\alpha$ | 0 |
| (9) | 0 | 0 | 0 | K0 |

FIG. 31

| PATCH No. | C GRADIENT | M GRADIENT | Y GRADIENT | K GRADIENT |
|---|---|---|---|---|
| (1) | C00 | M00 | Y00 | 0 |
| (2) | C01 | M01 | Y01 | 0 |
| (3) | C02 | M02 | Y02 | 0 |
| (4) | C03 | M03 | Y03 | 0 |
| (5) | C04 | M04 | Y04 | 0 |
| (6) | C05 | M05 | Y05 | 0 |
| (7) | 0 | 0 | 0 | K0 |

FIG. 32

| PATCH No. | EXPLANATORY VARIABLE C | EXPLANATORY VARIABLE M | EXPLANATORY VARIABLE Y | RESPONSE VARIABLE R |
|---|---|---|---|---|
| (1) | C00 | M00 | Y00 | r00 |
| (2) | C01 | M01 | Y01 | r01 |
| (3) | C02 | M02 | Y02 | r02 |
| (4) | C03 | M03 | Y03 | r03 |
| (5) | C04 | M04 | Y04 | r04 |
| (6) | C05 | M05 | Y05 | r05 |

COLOR IMAGE FORMING APPARATUS AND METHOD FOR CONTROLLING COLOR IMAGE FORMING APPARATUS

FIELD OF THE INVENTION

The present invention relates to a color image forming apparatus utilizing an electrophotography scheme, such as a color printer, a color copying machine or the like and, more particularly, to a control process of density-gradation characteristics and chromaticity of that apparatus.

RELATED BACKGROUND ART

Recently, in the field of color image forming apparatus utilizing an electrophotography scheme or an ink jet scheme, such as color printers and color copying machines or the like, enhancement in quality of output images has been demanded. Especially, density gradation and its stability are crucial factors that greatly affect how image quality is judged.

However, in the color image forming apparatus, changes in conditions of some portions in the apparatus caused by changes in environmental conditions or by long time use of the apparatus bring about changes in density of output images. Especially, in the case of the color image forming apparatus utilizing an electrophotography scheme, even slight changes in environmental conditions cause a change in density so as to deteriorate color balance. So it is necessary to provide some means for maintaining constant density-tone characteristics. Therefore, such apparatus are generally provided with tone correcting means, such as processing conditions including a plurality of exposure quantities and developing biases and a look up table (LUT), and processing conditions or values for gradation correction that would be optimum at that time are to be selected. In addition, in order that constant density-tone characteristics can be obtained even if changes in conditions occur in some portions of the apparatus, toner patches for density detection are formed on an intermediate transferring member or a drum etc. with toners of respective colors. The density of these toner patches (which have not fixed yet) is detected by a density detection sensor for unfixed toner (hereinafter referred to as a density sensor), and the result of the detection is used as feedback to a processing condition such as an exposure value or a developing bias etc so as to control the density so that stable images would be obtained.

However, in the above-mentioned density control method using the density sensor, since the patches are formed on an intermediate transferring member or a drum so as to be detected, changes in the color balance of an image caused by subsequent processing such as transferring to a transferring material or fixing are not controlled. Actually, changes in the color balance are caused also by application of heat and pressure during fixing or depending on transferring efficiency in the transfer of a toner image onto a transferring material. Such changes cannot be controlled by the above-mentioned density control using the density sensor.

In view of the above situation, such an color image forming apparatus having a sensor (which will be referred to as a color sensor hereinafter) for detecting the color of a patch formed on a transferring material is conceived in which a gray patch formed by black (K) and a process gray patch formed by mixing cyan (C), magenta (M) and yellow (Y) are produced, and after fixing them, the colors of those two patches are compared relatively, so that a mixing ratio of cyan, magenta and yellow with which the process gray patch would become achromatic can be determined.

In this color image forming apparatus, the result of the detection may be used as feedback to an exposure value or a processing condition of an image forming section, a color matching table for converting an RGB signal in the image processing section into a color reproduction gamut (area) of the color image forming apparatus, a color separation table for converting an RGB signal to a CMYK signal, or a calibration table for correcting density-gradation characteristics. Thus, the color image forming apparatus can control the density or chromaticity of a final output image that has been formed on a transferring material.

A control process similar to the above can also be performed by detecting an image output from the color image forming apparatus using an external image reading apparatus or color meter and densitometer. However the above-described control process using the color sensor is more advantageous in that the control is completed in the printer itself. The color sensor is arranged to include as light emitting elements, for example, three or more light sources that have light emission spectrums different from each other (e.g. red (R), green (G), and blue (B) etc.). Alternatively, the light emitting elements of the color sensor may be comprised of a light source(s) emitting white (W) light that is provide with three or more filters that have spectral transmittances different from each other (e.g. red (R), green (G), and blue (B) etc.) formed thereon. With the above arrangements, three or more different outputs, such as R, G and B outputs, can be obtained from the color sensor.

In the control process using the color sensor as described above, it is necessary to form patches on a transferring material, whereby the transfer material and toners are consumed. Therefore that control process cannot be performed frequently. So there exists a need in the art to perform effective controlling of density or chromaticity with a reduced frequency of the control process.

On the other hand, in order to enable the above-mentioned correction for realizing an achromatic process gray, means for obtaining a ratio of cyan, magenta and yellow with which the process gray becomes achromatic is required.

SUMMARY OF THE INVENTION

The present invention has been made in view of the above-described circumstances. An object of the present invention is to realize controlling of the density-gradation characteristics that is superior in that gray balance of tertiary color is taken into account, as compared to conventional controlling of the density-gradation characteristics that uses only a density sensor, in an individual color image forming apparatus, by using a combination of a color sensor and a density sensor while reducing frequency of the control process of the density-gradation characteristics using the color sensor so as to suppress consumption of transferring material.

It is another object of the present invention to provide a color image forming apparatus that is able to determine a ratio of cyan, magenta and yellow with which the process gray becomes achromatic based on chromaticity detected by the color sensor.

According to the present invention, there is provided an image forming apparatus comprising: image forming means for forming images of an achromatic color component and a plurality of chromatic color components and superimposing those images to form a color image; patch forming means for causing said image forming means to form a mixed color or monochromatic patch; a density sensor for detecting density of the patch thus formed; a color sensor for detecting chromaticity of the patch thus formed; and control means for controlling a color image forming condition based on a result of the detection by the density sensor and a result of the detection by the color sensor.

According to the present invention, there is also provided a control method for an image forming apparatus that forms images of an achromatic color component and a plurality of chromatic color components and superimposes those images to form a color image, comprising: a step of forming a mixed color patch; a step of measuring chromaticity of the mixed color patch thus formed by means of a color sensor; a step of correcting an image forming condition with respect to each of the color components based on a result of the measurement; a step of forming a monochromatic patch in accordance with the corrected image forming condition; a step of measuring density of the monochromatic patch thus formed by means of a density sensor; and a step of setting, based on a result of the measurement, a target value for a monochromatic control process to be performed subsequently according to predetermined timing.

According to the present invention, there is further provided a color image forming apparatus comprising: image forming means for forming a patch on a transferring material using a plurality of color materials; and chromaticity detecting means for detecting chromaticity of the patch formed on the transferring material by the image forming means, in which an image forming condition is corrected based on the chromaticity detected by the chromaticity detecting means, and wherein the image forming means forms a plurality of patches by mixing the plurality of color materials while varying amounts of the respective color materials in several ways.

According to the present invention there is still further provided a color image forming method in a color image forming apparatus, comprising: a step A of forming a plurality of patches by mixing a plurality of color materials while varying amounts of the respective color materials in several ways; a step B of detecting chromaticity of the patches formed in the step A; a step C of correcting an image forming condition based on the chromaticity detected in the step B.

According to the present invention, there is still further provided a method for controlling a color image forming apparatus, comprising: a step D of forming a plurality of mixed color patches by mixing color materials of cyan, magenta and yellow while varying amounts of the respective color materials in several ways; a step E of forming a monochromatic patch by black; a step F of detecting chromaticity of the patches formed in the step D and the step E; a step G of calculating amounts of cyan, magenta and yellow that would produce a chromaticity closest to that of the monochromatic patch by black based on the chromaticity detected in the step F so as to correct an image forming condition.

These and other objects, features and advantages of the present invention will become apparent upon consideration of the following description of the preferred embodiments of the invention taken in conjunction with the accompanying drawings.

BRIEF DESCRIPTION OF THE DRAWINGS

FIG. 31 is a table showing data of a patch pattern to be formed on a transferring material in Embodiment 8.

FIG. 32 is a table showing data of a patch pattern to be formed on a transferring material.

DETAILED DESCRIPTION OF THE PREFERRED EMBODIMENTS

Embodiment 1

Figure 1:
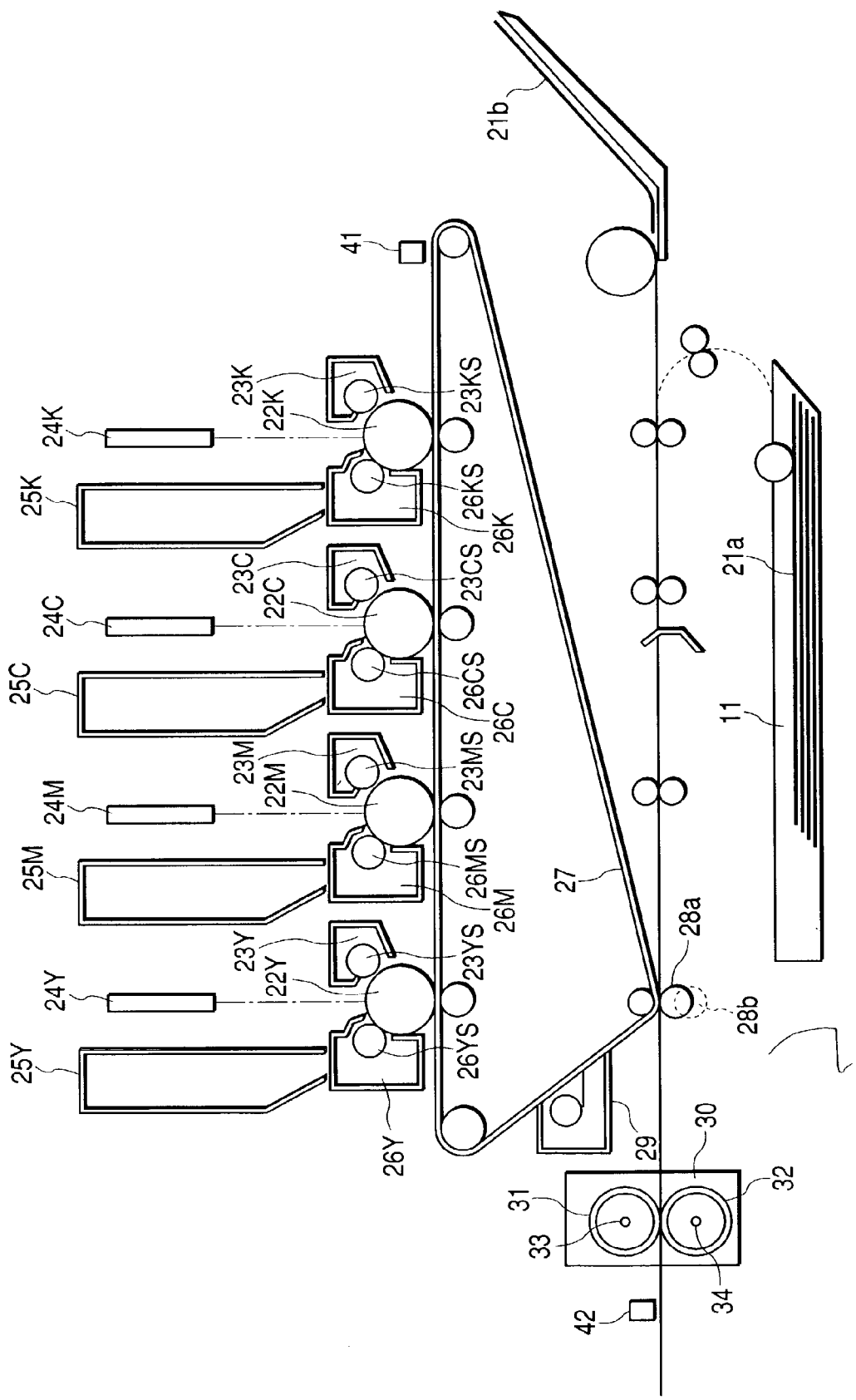
FIG. 1 is a cross sectional view schematically showing an overall structure of an apparatus according to Embodiment 1.

FIG. 1 is a cross sectional view showing an overall structure of a color image forming apparatus as Embodiment 1 of the invention. This apparatus is an example of a color image forming apparatus utilizing an electrophotography scheme in the form of a tandem color image forming apparatus that uses an intermediate transfer member 27. This color image forming apparatus comprises an image forming section shown in FIG. 1 and an image processing section, which is not shown in the drawings.

Figure 2:
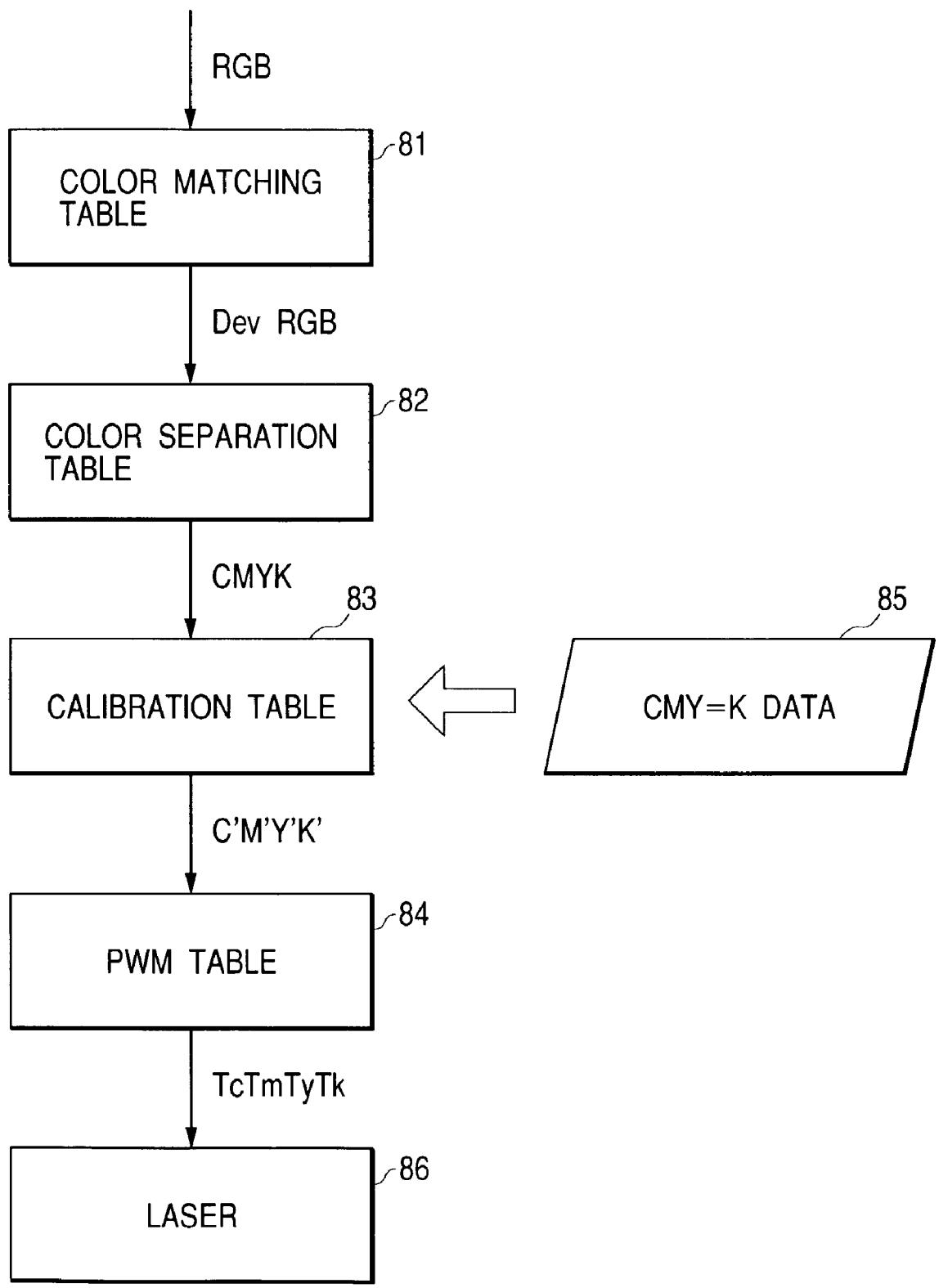
FIG. 2 is a flow chart showing a process in an image processing section.

First, a description will be made of a process in the image processing section. FIG. 2 is a chart showing an example of a process in the image processing section of the color image forming apparatus. A color matching unit 81 converts, based on a color matching table prepared in advance, an RGB signal representing the color of an image, which is sent from a personal computer etc., into a device RGB signal (which will be referred to as DevRGB signal hereinafter) that is matched with a gamut (or area) of color reproduction of the color image forming apparatus. A color separating unit 82 converts, based on a color separation table prepared in advance, the DevRGB signal into a CMYK signal corresponding to cyan, magenta, yellow and black, that is, the colors of toners used in this color image forming apparatus. A calibration unit 83 has a calibration table(s) for correcting density-gradation characteristics that are peculiar to each individual color image forming apparatus and converts, utilizing the calibration table, the CMYK signal into a C'M'K'Y' signal that has been corrected with respect to density-gradation characteristics. A PWM unit 84 generates, utilizing a PWM table (i.e. a pulse width modulation table), a PWM signal representing exposure time Tc, Tm, Ty, Tk of the scanning units 24C, 24M, 24Y and 24K corresponding to the C'M'Y'K' signal. The PWM signal thus generated is sent to a laser unit 86.

In the following, a description will be made of an operation of the image forming section of the image forming apparatus utilizing an electrophotography scheme. In the image forming section, electrostatic latent images are formed by exposure using a laser beam in accordance with the exposure times generated in the image processing section. Then, the electrostatic latent images are developed, so that toner images of respective color components including black (K) as an achromatic color component and yellow (Y), magenta (M) and cyan (C) as chromatic color components are formed. These monochromatic toner images are superposed (i.e. primarily transferred) on the intermediate transferring member, so that a multi-color toner image is formed on the intermediate transferring member. The multi-color toner image is then transferred (secondarily) to a transferring material 11 and fixed on the transferring material 11. The image forming section, which carries out the above process, is provided with a sheet feeding unit 21, photosensitive members 22Y, 22M, 22C and 22K, injection charging means 23Y, 23M, 23C and 23K as primary charging means, toner cartridges 25Y, 25M, 25C and 25K, developing means 26Y, 26M, 26C and 26K, the intermediate transferring member 27, a transferring roller 28, cleaning means 29, fixing unit 30, a density sensor 41 and a color sensor 42. In the above arrangement, the photosensitive members 22Y, 22M, 22C and 22K, the injection charging means 23Y, 23M, 23C and 23K, the toner cartridges 25Y, 25M, 25C and 25K and the developing means 26Y, 26M, 26C and 26K are arranged in stations for the respective developing colors that are juxtaposed with each other.

The photosensitive drums (or the photosensitive members) 22Y, 22M, 22C and 22K are composed of aluminum cylinders the outer periphery of which are coated with organic photoconductor films. The photosensitive drums 22Y, 22M, 22C and 22K are rotated by driving force transmitted from a driving motor, which is not shown. The driving motor causes the photosensitive drums 22Y, 22M, 22C and 22K to rotate counterclockwise in accordance with the image forming operation.

In the image forming section of this apparatus, the four injecting chargers 23Y, 23M, 23C and 23K for charging yellow (Y), magenta (M), cyan (C) and black (K) photosensitive members are provided as primary charging means for the respective stations. The injecting chargers 23Y, 23M, 23C and 23K are provided with sleeves 23YS, 23MS, 23CS and 23KS respectively.

Exposing light for the photosensitive drums 22Y, 22M, 22C and 22K is transmitted from scanner units 24Y, 24M, 24C and 24K. The surfaces of the photosensitive drums 22Y, 22M, 22C and 22K are selectively exposed to the exposing light so that the electrostatic latent images would be formed.

The image forming section of this apparatus is provided with four developing devices 26Y, 26M, 26C and 26K as the developing means for the respective stations, which perform development with yellow (Y), magenta (M), cyan (C) and black (K) respectively. The developing devices 26Y, 26M, 26C and 26K are provided with sleeves 26YS, 26MS, 26CS and 26KS respectively. Each of the developing devices is mounted detachably.

The intermediate transferring member 27 is in contact with the photosensitive drums 22Y, 22M, 22C and 22K, and rotates clockwise upon forming a color image in accordance with rotations of the photosensitive drums 22Y, 22M, 22C and 22K, so that monochromatic toner images are transferred onto the intermediate transferring member 27. After that, the transferring roller 28 (which will be described later) is brought into contact with the intermediate transferring member 27 to hold and carry the transferring material 11 therebetween, so that a multi-color toner image formed on the intermediate transferring member 27 is transferred onto the transferring material 11.

During the transferring of the multi-color image onto the transferring material 11, the transferring roller 28 assumes a position denoted by reference numeral 28a in FIG. 1 so as to be in contact with the transferring material 11. After the printing operation is completed, the transferring roller 28 is moved to a position 28b apart from the transferring material.

The fixing unit 30 is to melt and fix the transferred multi-color image while carrying the transferring material 11. The fixing unit 30 is provided with a fixing roller 31 for heating the transferring material 11 and a pressing roller 32 for pressing the transferring material 11 against the fixing roller 31. The fixing roller 31 and the pressing roller 32 have hollow structures and accommodate heaters 33 and 34 respectively in the interiors thereof. Thus, the transferring material 11 bearing the multi-color toner image is applied with heat and pressure while it is carried by the fixing roller 31 and the pressing roller 32. Thus, the toner is fixed on the surface of the transferring material 11.

After the fixing of the toner image, the transferring material 11 is discharged by a discharging roller (not shown) to a discharge tray (not shown). Thus, the image forming operation is completed.

The cleaning means 29 is to clean the toner remaining on the intermediate transferring member 27. The waste toner remaining after the multi-color toner image comprised of four colors formed on the intermediate transferring member 27 is transferred onto the transferring material 11 is colleted in a cleaner container.

Figure 3:
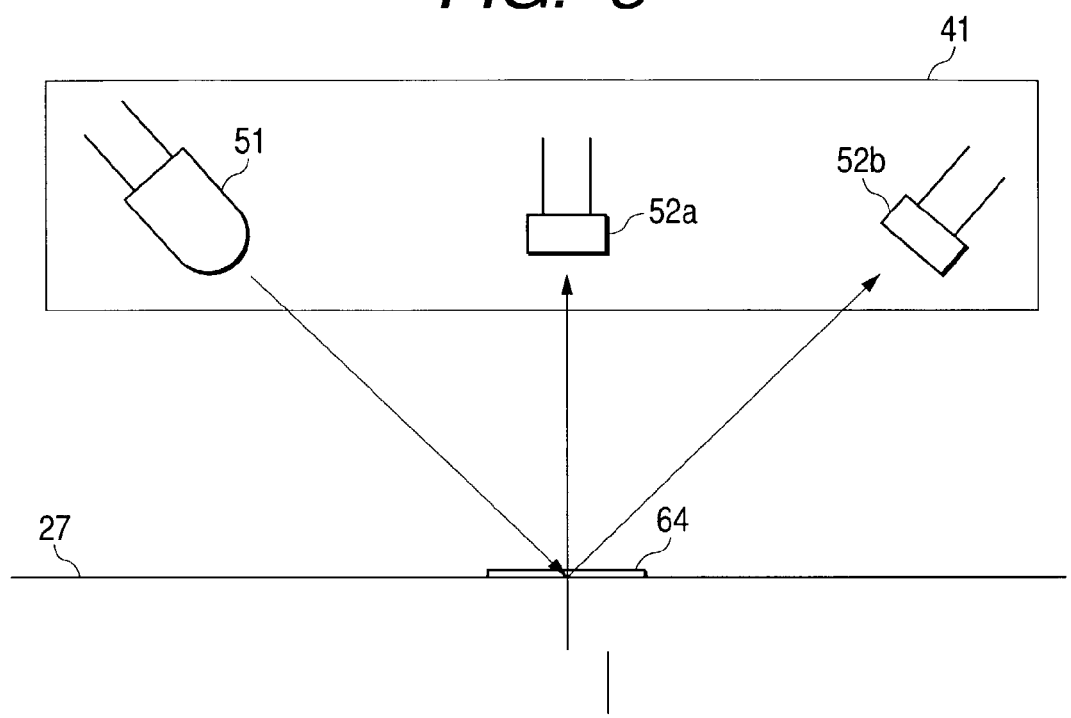
FIG. 3 is a drawing schematically showing a structure of a density sensor.

In the color image forming apparatus shown in FIG. 1, the density sensor 41 is disposed facing to the intermediate transferring member 27 to detect the density of toner patches formed on the surface of the intermediate transferring member 27. An example of a structure of the density sensor 41 is sown in FIG. 3. The density sensor 41 is comprised of an infrared light emitting element 51 such as an LED, a light receiving elements 52a and 52b such as photodiodes or a CDSs etc., an IC (not shown) for processing data on received light, and a holder (not shown) that houses the above parts.

The light receiving element 52a detects the light intensity of irregular or diffused reflection from a toner patch 64, while the light receiving elements 52b detects the light intensity of regular reflection from the toner patch 64. By detecting the light intensities of both the regular and irregular reflections, it is possible to detect the density of the toner patch 64 from a low density to a high density. In this connection, an optical element such as a lens may be used for coupling the light emitting element 51 and the light receiving elements 52a and 52b.

Figure 4:
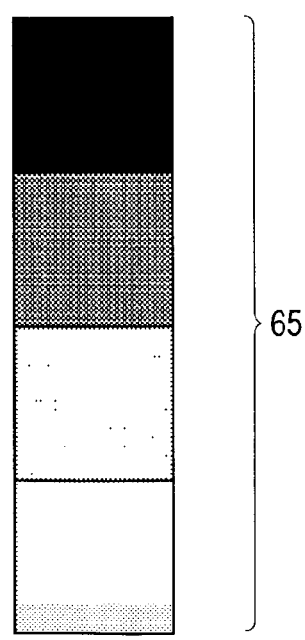
FIG. 4 illustrates a patch pattern that is used for controlling density-gradation characteristics.

FIG. 4 shows an example of a patch pattern used for controlling density-gradation characteristics, formed on the intermediate transferring member 27. In the patch pattern, monochromatic gradation patches 65 of unfixed black (K) toner are arranged in series. After the gradation patches of the black (K) toner are formed, monochromatic toner patches of the cyan (C), magenta (M) and yellow (Y) toners are subsequently formed. The density sensor 41 cannot discriminate the colors of the toners on the intermediate transferring member 27. Accordingly, the gradation patches 65 of monochromatic toners are formed on the intermediate transferring member. Density data thus obtained are used as feedback to a calibration table(s) for correcting the density-gradation characteristics in the image processing section or various processing conditions in the image forming section.

Some types of density sensor 41 can convert, as far as the patches are monochromatic patches of C, M, Y and K, the detected density into color difference relative to a specific type of paper using a conversion table for converting the density into the color difference relative to the specific type of paper and output the color difference. When such a density sensor that can output the color difference relative to a specific type of paper as well as the density is used, the control process may be directed to color difference-gradation characteristics relative to the specific type of paper with respect to C, M, Y and K instead of to the density-gradation characteristics with respect to C, M, Y and K. In that case, the forgoing description also applies by interpreting the density in the density-gradation characteristics as the color difference relative to a specific type of paper. When the control process is directed to the color difference-gradation characteristics relative to a specific type of paper with respect to C, M, Y and K, it is possible to obtain gradation characteristics that are more matched with the characteristics of the human visual sense.

In the color image forming apparatus shown in FIG. 1, the color sensor 42 is disposed downstream of the fixing unit 30 in the path of carrying the transferring material and facing the image forming surface of the transferring material 11. The color sensor 42 is to detect RGB output values with respect to the color of a mixed color patch after fixed that has been formed on the transferring material 11. Since the color sensor 42 is arranged in the interior of the color image forming apparatus, it is possible to detect the image automatically having been fixed before the transferring material 11 is discharged to the discharging section.

Figure 5:
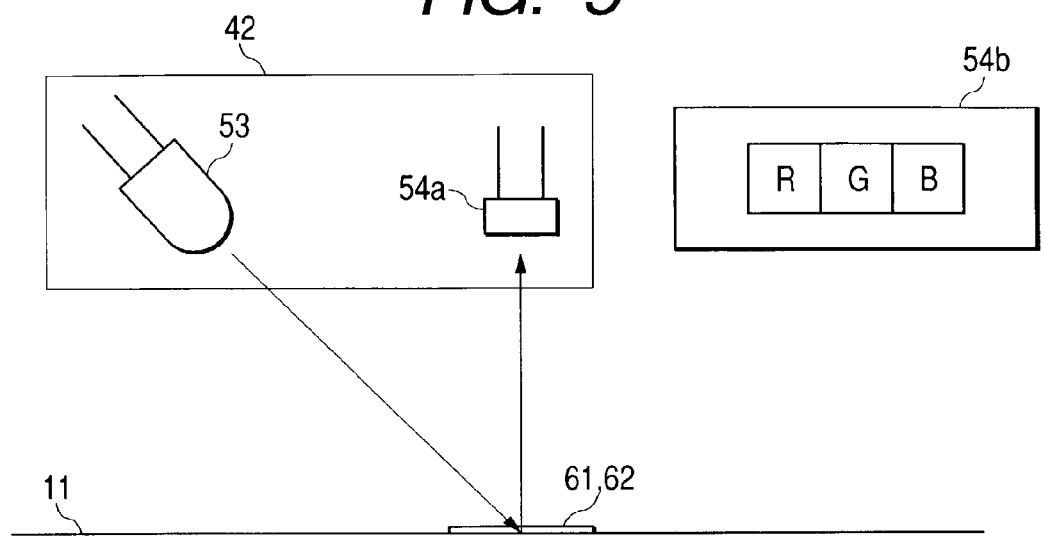
FIG. 5 is a drawing schematically showing a structure of a color sensor.

In FIG. 5, an example of the structure of the color sensor 42 is shown. The color sensor 42 is comprised of a white color LED 53 and a charge accumulating sensor 54a having an RGB on-chip filter. In this color sensor 42, light emitted from the white color LED 53 is incident on the transferring material 11, on which fixed patches have been formed, from an oblique direction at the angle of 45 degrees, and the light intensity of irregular reflection in the direction of 0 (zero) degree is detected by the charge accumulating sensor 54a having the RGB on-chip filter. The light receiving portion 54b of the charge accumulating sensor 54a having the RGB on-chip filter has independent pixels for red (R), green (G) and blue (B) as shown in FIG. 5.

The charge accumulating sensor used as the charge accumulating sensor 54a having the RGB on-chip filter may be a photodiode. The charge accumulating sensor may comprise a several sets of three pixels for R, G and B. In the arrangement shown in FIG. 5, the angle of incidence is 45 degrees and the angle of reflection is 0 degree. However, an arrangement in which the angle of incidence is 0 degree and the angle of reflection is 45 degrees may also be adopted. Furthermore, the sensor may be composed of an LED unit emitting three colors of light (i.e. R, G and B) and a sensor without a filter.

Figure 6:
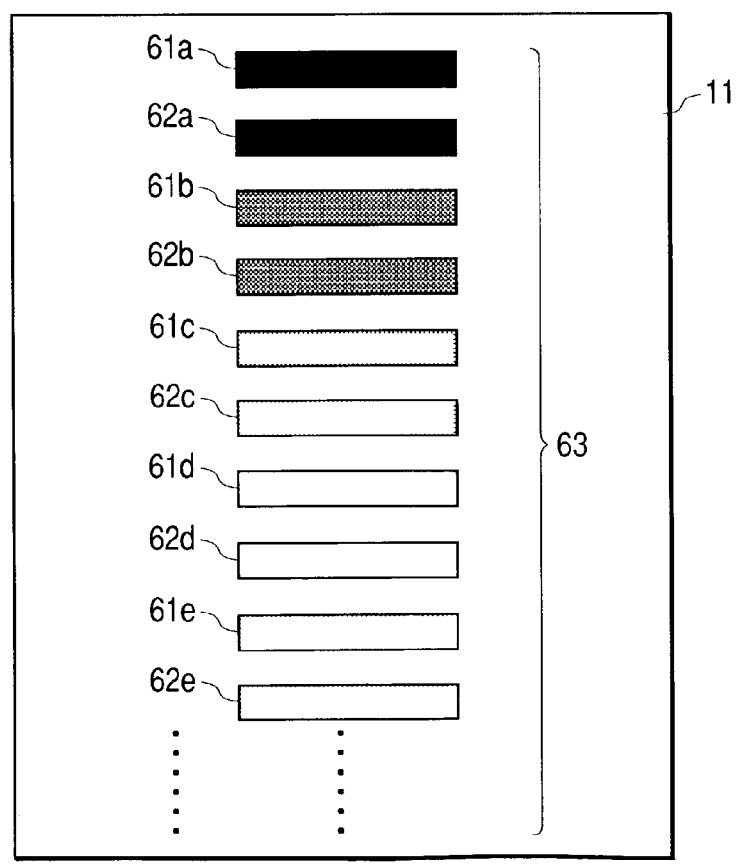
FIG. 6 illustrates a patch pattern to be formed on a transferring material that is used for controlling density-gradation characteristics.

In FIG. 6, an example of a patch pattern used for controlling density-gradation characteristics after the fixing formed on the transferring material 11 is shown. The patch pattern for controlling density-gradation characteristics is a gray gradation patch pattern. Gray is the center of the gamut (area) of color reproduction and a very important color for adjusting color balance. In the patch pattern 63, gray gradation patches 61 formed by black (K) and process gray patches 62 formed by mixing cyan (C), magenta (M) and yellow (Y) are arranged in pairs in a manner in which gray gradation patches formed by K and a CMY process gray gradation patches that have the chromaticities close to each other respectively in a standard color image forming apparatus (i.e. patches 61a and 62a, patches 61b and 62b and patches 61c and 62c etc.) are juxtaposed in pairs. The color sensor 42 detects RGB output values with respect to these patches.

In addition, if an absolute white reference is set, it is possible to calculate absolute chromaticity.

Furthermore, since the RGB output values vary continuously with variation of the gradient, it is possible to calculate estimated RGB output values with respect to an intermediate gradient between the detected gradients by performing mathematical processing such as first order or second order approximation based on RGB output values with respect to a certain gradient and RGB output values with respect to a gradient adjacent to said certain gradient. Even if there is no absolute white reference and the absolute chromaticity cannot be calculated, it is possible to calculate a mixing ratio of the three colors (i.e. C, M and Y) in a process gray patch formed by mixing cyan (C), magenta (M) and yellow (Y) that would have approximately the same chromaticity as a gray patch formed by black (K) having a certain gradient, by relatively comparing the RGB output values with respect to the gray gradation patches formed by black (K) and the RGB output values with respect to the CMY process gray gradation patches.

In the case in which outputs of the means for detecting the color of a fixed patch formed on the transferring material comprise outputs of three different colors, the absolute chromaticity of a process gray patch and that of a gray patch formed by black (K) are regarded as equal to each other, when the outputs of three different colors with respect to the process gray patch are equal to the outputs of three different colors with respect to the gray patch formed by black (K).

Figure 14:
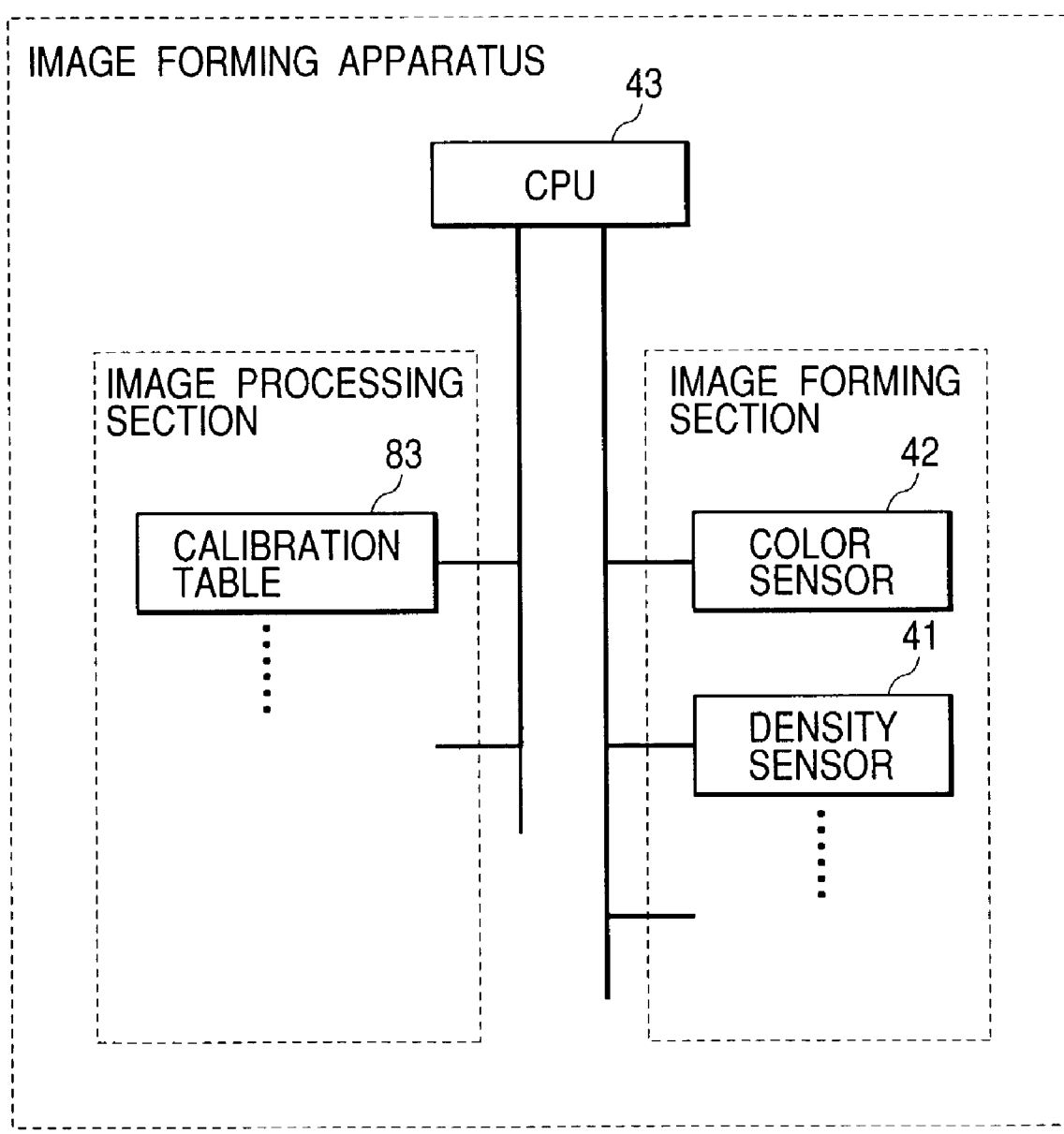
FIG. 14 is a block diagram showing an electric system concerning the density-gradation characteristics control process.

In FIG. 14, a diagram of an electric system concerning the density-gradation characteristics control process of the image forming apparatus of this embodiment is shown. As shown in FIG. 14, a calibration table 83 belongs to the image processing section, while the density sensor 41 and the color sensor 42 belong to the image forming section. Detection data of the density sensor 41 and the color sensor 42 are sent to a CPU 43. In the CPU 43, the above-mentioned calculation for determining a mixing ratio of the three colors of C, M and Y in the CMY process gray gradation patch that would have the same chromaticity as a certain gray gradation patch formed by black (K) is performed. The result of the calculation is used as feedback to the calibration table 83, so the result is transferred from the CPU 43 to the calibration table 83. Update of the calibration table 83 based on this feedback is reflected in the subsequent image forming operation.

Figure 7:
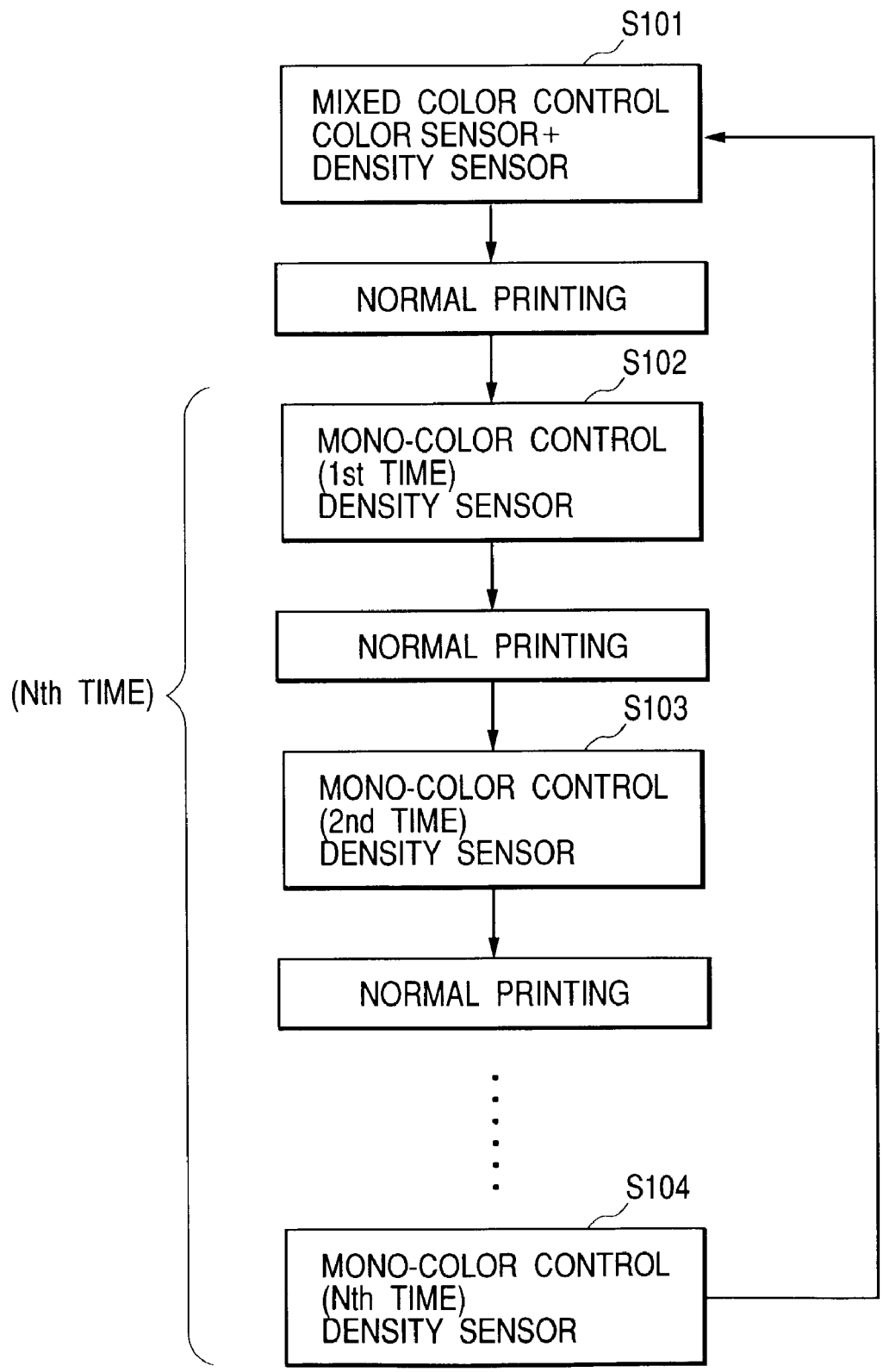
FIG. 7 is a flow chart showing a density-gradation characteristics control process in which the color sensor and the density sensor are used in combination.

FIG. 7 is a flow chart showing a process for controlling density-gradation characteristics using a combination of the color sensor 42 and the density sensor 41 according to this embodiment. Since the control process using the color sensor consumes transferring materials, the number of times for carrying out the control process is restricted as compared to the control process using the density sensor. Therefore, as shown in FIG. 7, first in step 101 (denoted as S101 in FIG. 7), the density-gradation characteristics control process using the color sensor and the density sensor (this control process will be referred to as mixed color control process hereinafter) is carried out. After that, in steps 102 to 104, the density-gradation characteristics control process using only the density sensor (this control process will be referred to as monochromatic control process hereinafter) is performed a predetermined number of times, and then the process returns to the mixed color control process.

As shown in FIG. 7, the mixed color control process and the monochromatic control process are performed during intervals of normal printing operations. The control processes may be performed at a predetermined timing, such as upon turning on the color image forming apparatus, after a predetermined number of images are formed, upon detection of variations in a specific environmental condition or upon exchanging expendable supplies. Alternatively, the user may perform the control processes by manually operating the apparatus when the control processes are desired. The number on times for performing the monochromatic control process is to be set in advance. In connection with this, the control process may be arranged in such a way that when changes in conditions of the color image forming apparatus such as the turning-on of the power, environmental variation or the replacement (or change) of expendable supplies occur, the process returns to the mixed color control process even if the monochromatic control process has not been performed the predetermined number of times.

Figure 8B:
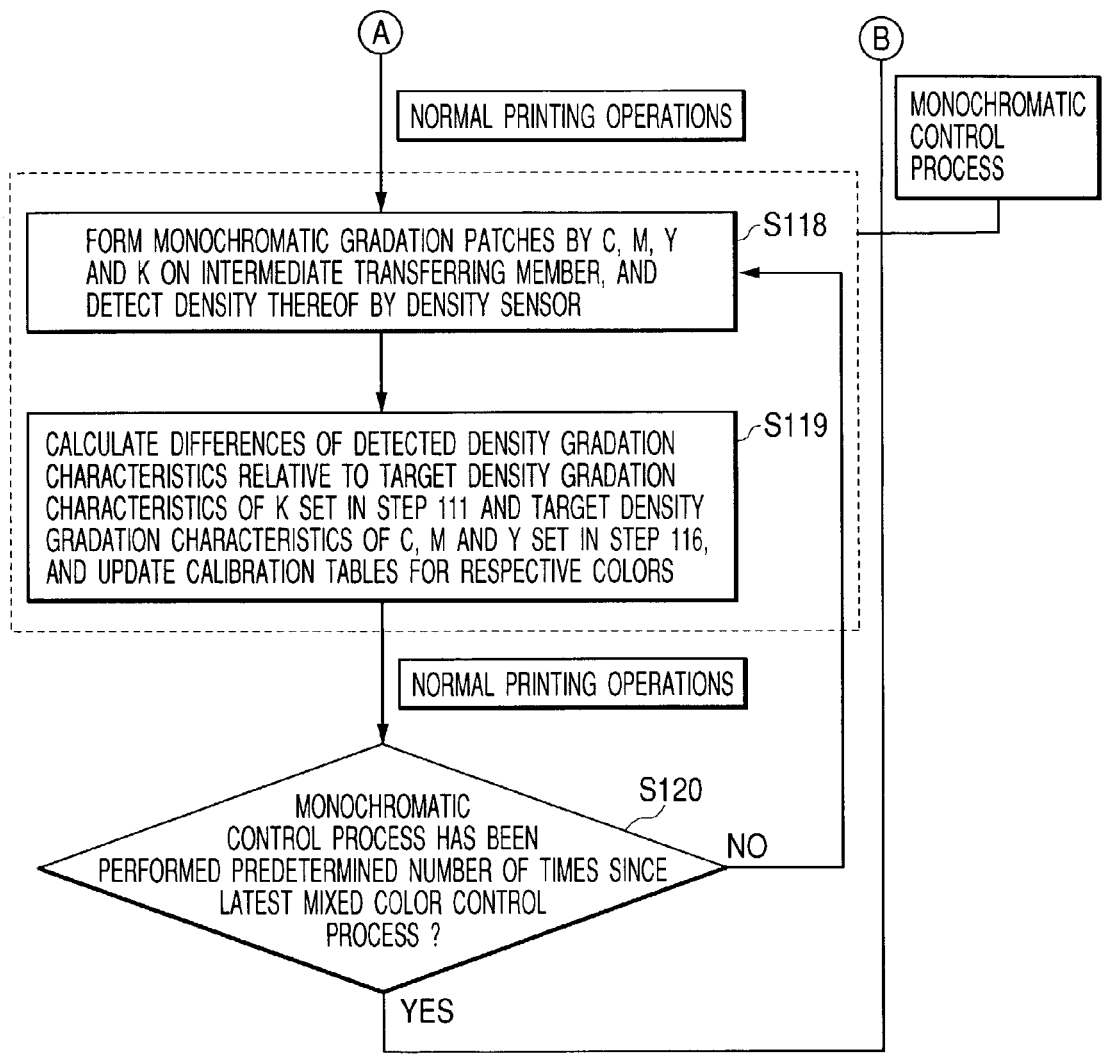
FIG. 8 which is composed of FIGS. 8A and 8B are flow charts specifically showing a density-gradation characteristics control process in Embodiment 1 in which a mixed color control process and a monochromatic control process are used in combination.

FIGS. 8A and 8B are flow charts specifically showing the control process of density-gradation characteristics including a combination of the mixed color control process and the monochromatic control process.

In step 111, target density-gradation characteristics with respect to black (K) are set in advance. This setting is made at the time of designing the image processing section of the color image forming apparatus or at the time of shipping the color image forming apparatus.

The subsequent steps are performed at a user site at which the color image forming apparatus is installed. Steps 112 to 117 correspond to the mixed color control process S101 that has been described above in connection with FIG. 7.

In step 112, gradation patches by black (K) are formed on the intermediate transferring member, and the density thereof is detected by the density sensor.

In step 113, differences between the detected density-gradation characteristics of the gradation patches by black (K) and the target density-gradation characteristics set in step 111 are calculated, and the calibration table for correcting the density-gradation characteristics of black (K) in the image processing section is updated in such a way that the density-gradation characteristics coincide with the target.

Figure 9:
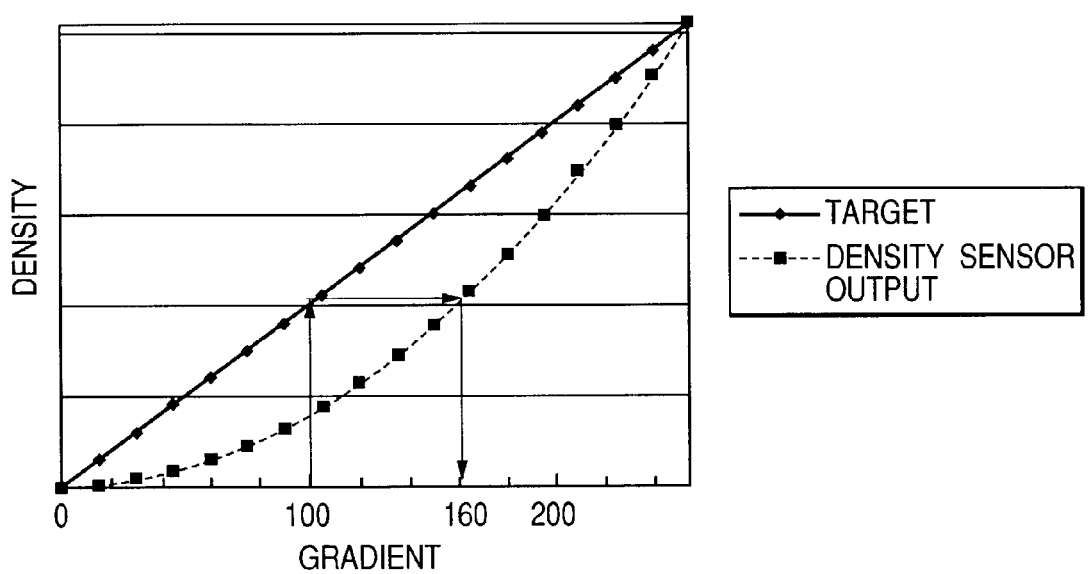
FIG. 9 is a diagram illustrating a process for updating a calibration table in the image processing section.

In the following, a method for updating the calibration table in step 113 will be described with reference to FIG. 9. For example in a color image forming apparatus capable of producing 255 gradations, if for example, the gradient of the target density is 100 and the output of the density sensor actually obtained is lower than that target gradient, it turns out that in order to obtain the same density the gradient is required to be set to 160 as will be seen from FIG. 9, then the calibration table should be updated in such a way that K100 is converted to K'160. The calibration table is updated by repeating the same process for a plurality of gradients. In this connection, in the example shown in FIG. 9, the gradient and the target density are in a linear relationship, but it need not be necessarily linear.

Next, in step 114, a pattern for density-gradation characteristics control in which gray gradation patches by black (K) and CMY process gray gradation patches are formed on a transferring material and fixed is output, and after its passing through the fixing device 30, the RGB outputs of the patches are detected by the color sensor 42. Upon the formation of the gray patches, the calibration table updated in step 113 is used only for black (K), and it is not used for cyan (C), magenta (M) and yellow (Y).

In step 115, gradients of cyan (C), magenta (M) and yellow (Y) of the CMY process grays that would have the chromaticities same as those of the gray patches by black (K) of respective gradients are calculated based on the RGB output values of the gray gradation patches by black (K) and the CMY process gray gradation patches detected in step 114. This calculation is performed based on the fact that the RGB output values vary continuously with variation of the gradient. In this calculation, the chromaticities need not to be made exactly the same, that is, the chromaticities may be regarded as the same if the color difference therebetween is within an allowable color difference range that has been set in advance.

In step 116, calibration tables for cyan (C), magenta (M) and yellow (Y) are created using the gradients of C, M and Y respectively that have been calculated in step 115. The calibration tables are created in the following way. If for example, the gradients of C, M and Y of the CMY process gray that has the chromaticity same as that of the gray patch by black (K) of gradient 100 formed in step 114 are C100, M 120 and Y80, the calibration tables for C, M and Y are created in such a way that C100 is converted into C'140 by the calibration table for C, M100 is converted into M'120 by the calibration table for M, and Y100 is converted into Y'80 by the calibration table for Y respectively. The same process is performed for each of the gray patches of other gradients. Thus, the calibration tables for C, M and Y are created.

In step 117, an unfixed patch pattern for density-gradation characteristics control including monochromatic gradation patches of cyan (C), magenta (M) and yellow (Y) is formed on the intermediate transferring member using the calibration tables for C, M and Y created in step 116. Then density thereof is detected by the density sensor, and the detected density-gradation characteristics are set as target density-gradation characteristics for respective colors of C, M and Y.

Steps 118 and 119 correspond to the monochromatic control processes S102, S103 and S104 shown in FIG. 7. Between steps 117 and 118, normal printing operations are performed.

In step 118, monochromatic gradation patches of C, M, Y and K are formed on the intermediate transferring member, and the density thereof is detected by the density sensor.

In step 119, the differences between the detected density-gradation characteristics relative to the target density-gradation characteristics of black (K) set in step 111 and the target density-gradation characteristics of cyan (C), magenta (M) and yellow (Y) created in step 117 are calculated, and the calibration tables for the respective colors are updated in such a way that the density-gradation characteristics coincide with the targets. The method for updating each of the calibration tables for cyan (C), magenta (M), yellow (Y) and black (K) is the same as that of the calibration table for black (K) performed in step 113.

Between steps 119 and 120, normal printing operations are performed. In step 120 it is determined whether or not the monochromatic control process has been performed a predetermined number of times since the latest mixed color control process up to now. When it is determined that the monochromatic control process has been performed the predetermined number of times, the process returns to step 112. On the other hand, when it is determined that the monochromatic control process has not been performed the predetermined number of times yet, the process returns to step 118.

In connection with this, the process may be arranged to return to the mixed color control process of step 112 when changes in conditions of the color image forming apparatus such as the turning-on of the power, environmental variations or replacement of expendable supplies occur, even if the monochromatic control process has not been performed the predetermined number of times yet.

If the density sensor can output color difference relative to a specific type of paper as well as density, the process may be arranged to control color difference-gradation characteristics relative to the specific type of paper instead of controlling the density-gradation characteristics. In that case, the forgoing description of the control process also applies by interpreting the density as the color difference relative to the specific type of paper. In that case, it is possible to obtain gradation characteristics that are more matched with the characteristics of the human visual sense.

If the color sensor can output absolute chromaticity, the process may be arranged to calculate, in step 115, gradients of cyan (C), magenta (M) and yellow (Y) of the CMY process grays that have the chromaticities same as those of the gray patches by black (K) of respective gradients, utilizing absolute chromaticities of the gray patches by black (K) and the CMY process gray patches.

As per the above, in this embodiment, a combination of the mixed color control process and the monochromatic control process is adopted using the color sensor and density sensor, so that the density-gradation characteristics can be controlled with good efficiency in the interior of the individual color image forming apparatus, while efficiently suppressing consumption of the transferring materials and toner. Furthermore, in this embodiment, the density-gradation characteristics of C, M, and Y are matched with the density-gradation characteristics of K, so gray balance can be stabilized. In addition, even when environmental variations that would vary the density-gradation characteristics occur, the hue of images is unlikely to vary, since the gradation-density characteristics of C, M, Y and K vary keeping in line with each other. Therefore, a color image forming apparatus that has high color reproducibility can be provided.

Embodiment 2

Figure 10B:
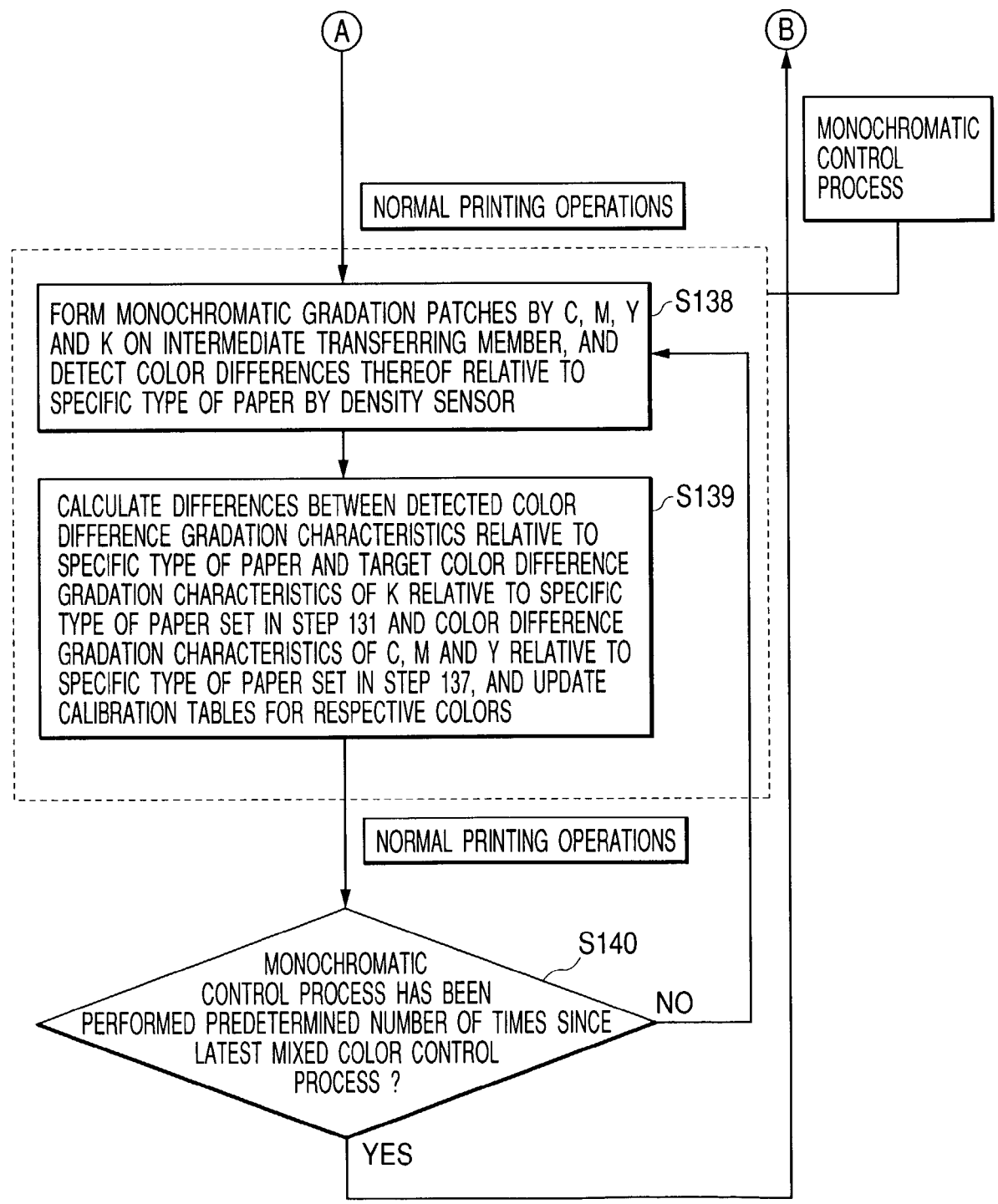
FIG. 10 which is composed of FIGS. 10A and 10B are flow charts specifically showing a control process for color difference-gradation characteristics relative to a specific type of paper in Embodiment 2 in which a mixed color control process and a monochromatic control process are used in combination.

FIGS. 10A and 10B are flow charts specifically showing a process for controlling color difference-gradation characteristics relative to a specific type of paper according to Embodiment 2. This process includes the mixed color control process and the monochromatic control process in combination. This embodiment differs from Embodiment 1 in the following points. First, the density sensor used in this embodiment outputs color difference relative to a specific type of paper in addition to density, and the color sensor outputs absolute chromaticity. Secondly, in the first updating of a calibration table for black (K) performed in the mixed color control process, gradation patches by black (K) are formed on a transferring material and the absolute chromaticity thereof is detected by the color sensor.

In the following, the process will be specifically described with reference to FIGS. 10A and 10B.

In step 131, target color difference-gradation characteristics with respect to black (K) relative to a specific type of paper is set in advance. This setting is made at the time of designing the image processing section or at the time of shipping the color image forming apparatus.

The subsequent steps are performed at a user site at which the color image forming apparatus is installed. Steps 132 to 137 correspond to the mixed color control process.

In step 132, gradation patches by black (K) are formed on a transferring material and the absolute chromaticity thereof is detected by the color sensor. These gradation patches may be produced by fixing the unfixed patch pattern 65 (FIG. 4) for density-gradation characteristics control.

In step 133, differences between color difference-gradation characteristics relative to the specific type of paper and the target color difference-gradation characteristics relative to the specific paper as set in step 131 are calculated based on the detected absolute chromaticities of the black (K) gradation patches and a known chromaticity of the specific type of paper, so that a calibration table for correcting the color difference-gradation characteristics of black (K) relative to the specific type of paper in the image processing section is updated in such a way that the color difference-gradation characteristics coincide with the target.

Figure 11:
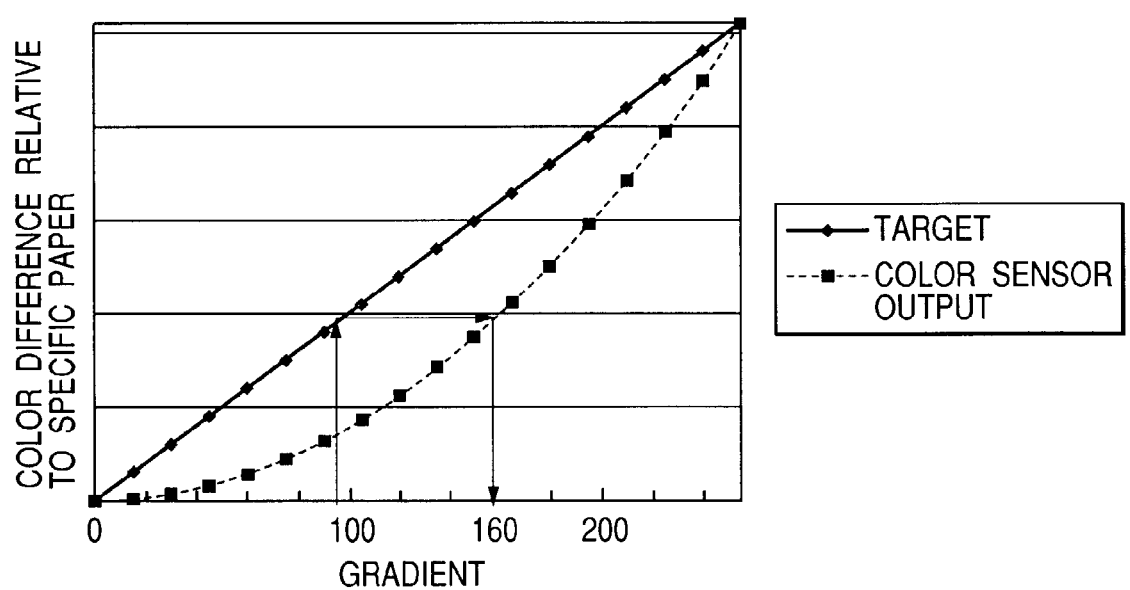
FIG. 11 is a diagram illustrating a process for updating a calibration table in the image processing section.

A method for updating the calibration table in step 133 will be described with reference to FIG. 11. For example in a color image forming apparatus capable of producing 255 gradations, if the gradient of the target color difference is 100 and a color difference determined from the output of the color sensor actually obtained is lower than that gradient, it turns out that the gradient is required to be set to 160 in order to obtain the same color difference as will be seen from FIG. 11, then the calibration table should be updated in such a way that K100 is converted to K'160. The calibration table is updated by repeating the same process for a plurality of gradients. In this connection, in the example shown in FIG. 11, the gradient and the target color difference are in a linear relationship, but it need not be necessarily linear.

Next, in step 134, a pattern used for controlling density-gradation characteristics in which gray gradation patches by black (K) and CMY process gray gradation patches are formed on a transferring material and fixed is produced, and after its passing through the fixing device 30, the absolute chromaticity of the patches is detected by the color sensor 42. Upon the formation of the gray patches, the calibration table updated in step 133 is used only for black (K), and it is not used for cyan (C), magenta (M) and yellow (Y).

In step 135, gradients of cyan (C), magenta (M) and yellow (Y) of the CMY process grays that would have the chromaticities same as those of the gray patches by black (K) of respective gradients are calculated based on the absolute chromaticities of the gray gradation patches by black (K) and the CMY process gray gradation patches detected in step 134. This calculation is performed based on the fact that the chromaticity varies continuously with variation of the gradient. In this calculation, the color differences need not to be made exactly the same, that is, the color differences may be regarded as the same if the difference therebetween is within an allowable color difference range that has been set in advance.

In step 136, calibration tables for cyan (C), magenta (M) and yellow (Y) are created using the gradients of C, M and Y respectively that have been calculated in step 135. The calibration tables are created in the following way. If for example, the gradients of C, M and Y of the CMY process gray that has the chromaticity same as that of the gray patch by black (K) of gradient 100 formed in step 134 are C140, M 120 and Y80, the calibration tables for C, M and Y are created in such a way that C100 is converted into C'140 by the calibration table for C, M100 is converted into M'120 by the calibration table for M, and Y100 is converted into Y'80 by the calibration table for Y respectively. The same process is performed for each of the gray patches of other gradients. Thus, the calibration tables for C, M and Y are created.

In step 137, an unfixed patch pattern for density-gradation characteristics control including monochromatic gradation patches of cyan (C), magenta (M) and yellow (Y) is formed on the intermediate transferring member using the calibration tables for C, M and Y created in step 137. Then the color differences thereof relative to the specific type of paper are detected by the density sensor, and the detected color difference-gradation characteristics relative to the specific type of paper are set as target color difference-gradation characteristics relative to the specific type of paper for respective colors of C, M and Y.

Steps 138 and 139 correspond to the monochromatic control process. Between steps 137 and 138, normal printing operations are performed.

In step 138, monochromatic gradation patches of C, M, Y and K are formed on the intermediate transferring member, and the color differences thereof relative to the specific type of paper are detected by the density sensor.

In step 139, differences between the detected color difference-gradation characteristics relative to the specific type of paper and the target color difference-gradation characteristics of black (K) relative to the specific type of paper set in step 131 and the target color difference-gradation characteristics of cyan (C), magenta (M) and yellow (Y) relative to the specific type of paper created in step 136 are calculated, and the calibration tables for the respective colors are updated in such a way that the color difference-gradation characteristics coincide with the targets. The method for updating each of the calibration tables for cyan (C), magenta (M), yellow (Y) and black (K) is the same as that of the calibration table for black (K) performed in step 133.

Between steps 139 and 140, normal printing operations are performed. In step 140 it is determined whether or not the monochromatic control process has been performed a predetermined number of times since the latest mixed color control process. When it is determined that the monochromatic control process has been performed the predetermined number of times, the process returns to step 132. On the other hand, when it is determined that the the monochromatic control process has not been performed predetermined number of times yet, the process returns to step 138.

In connection with this, the process may be arranged to return to the mixed color control process of step 132 when changes in conditions of the color image forming apparatus such as the turning-on of the power, environmental variations or replacement of expendable supplies occur, even if the monochromatic control process has not been performed the predetermined number of times yet.

As per the above, in this embodiment a combination of the mixed color control process and the monochromatic control process is adopted using the color sensor and density sensor. The first gradation characteristics control process with respect to black is performed with the color sensor, and the gradation characteristics are controlled based on color difference relative a specific type of paper instead of on density. With these features, the apparatus according to this embodiment also can provide the advantageous effects of Embodiment 1 and, in addition, realize controlling of gradation characteristics that is more matched with the characteristics of the human visual sense. Thus, a color image forming apparatus with high color reproducibility in which the hue of images is unlikely to vary can be provided.

Embodiment 3

Figure 12B:
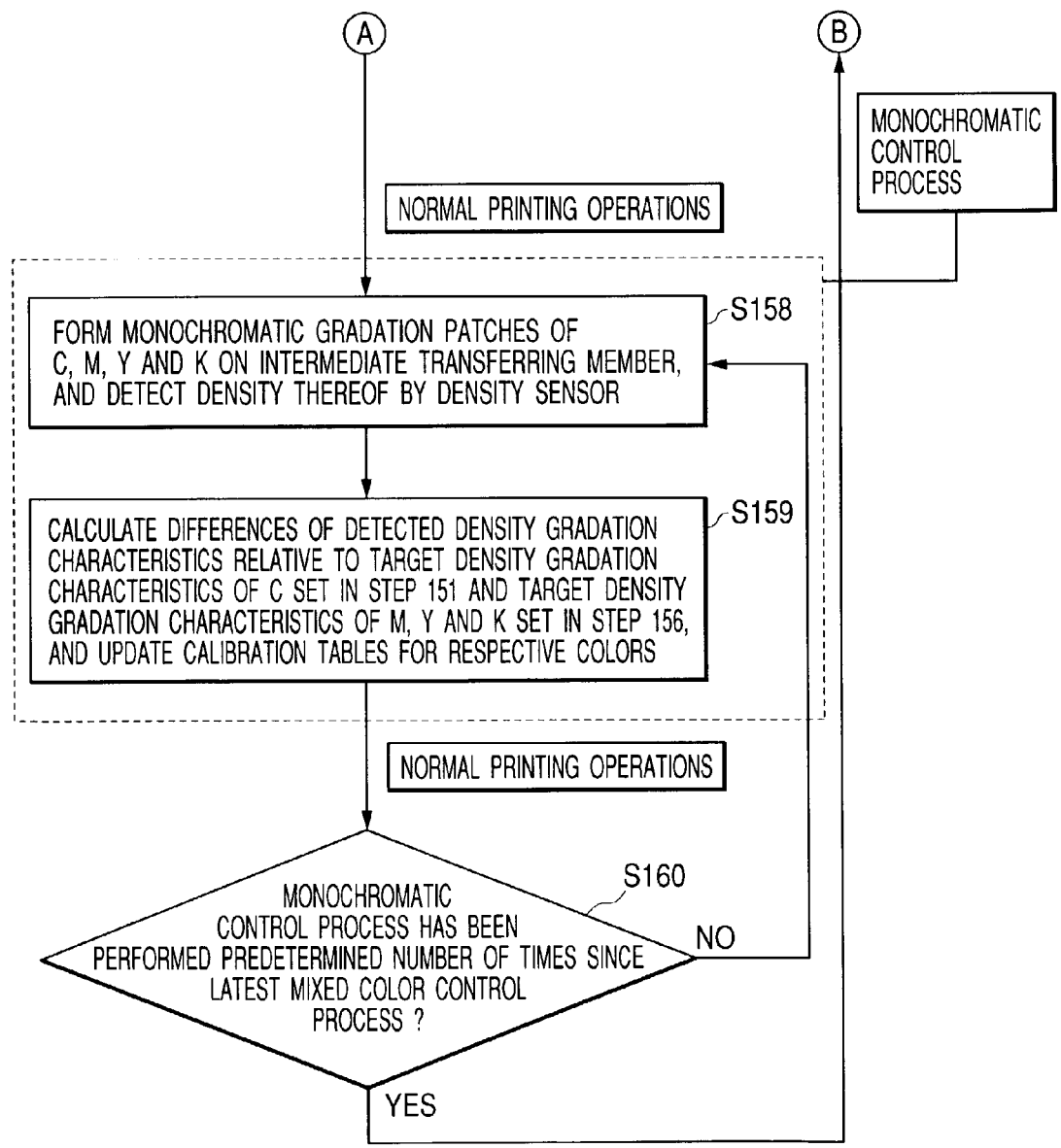
FIG. 12 which is composed of FIGS. 12A and 12B are flow charts specifically showing a density-gradation characteristics control process in Embodiment 3 in which a mixed color control process and a monochromatic control process are used in combination.

FIGS. 12A and 12B are flow charts specifically showing a process for controlling density-gradation characteristics according to Embodiment 3. This process includes the mixed color control process and the monochromatic control process in combination. This embodiment differs from Embodiments 1 and 2 in that the target density-gradation characteristics that is set at the time of designing the image processing section or before the shipping of the apparatus is directed to not black (K) but either one of cyan (C), magenta (M) and yellow (Y).

In step 151, target density-gradation characteristics with respect to either one of cyan (C), magenta (M) and yellow (Y) are set in advance. This setting is made at the time of designing the image processing section or at the time of shipping the color image forming apparatus. For the sake of simplicity, in the following description, it is assumed that the target is set for cyan (C). In the case in which the target is set for magenta (M) or yellow (Y), the following description also applies by replacing cyan (C) by magenta (M) or yellow (Y).

The subsequent steps are performed at a user site at which the color image forming apparatus is installed. Steps 152 to 157 correspond to the mixed color control process.

In step 152, cyan (C) gradation patches (i.e. the gradation patches formed by cyan (C)) are formed on the intermediate transferring member, and the density thereof is detected by the density sensor.

In step 153, the differences between the detected density-gradation characteristics of the cyan (C) gradation patches and the target density-gradation characteristics set in step 151 are calculated, and the calibration table for correcting the density-gradation characteristics of cyan (C) in the image processing section is updated in such a way that the density-gradation characteristics coincide with the target. The method for updating the calibration table is the same as that in Embodiment 1.

Next, in step 154, a pattern used for controlling the density-gradation characteristics in which gray gradation patches by black (K) and CMY process gray gradation patches are formed on a transferring material and fixed is output, and after its passing through the fixing device 30, the RGB outputs of the patches are detected by the color sensor 42. Upon the formation of the gray patches, the calibration table updated in step 153 is used only for cyan (C), and it is not used for black (K), magenta (M) and yellow (Y).

In step 155, the gradients of cyan (C), magenta (M) and yellow (Y) of the CMY process grays that would have the chromaticities same as those of the gray patches by black (K) of respective gradients are calculated based on the RGB output values of the gray gradation patches by black (K) and the CMY process gray gradation patches detected in step 154. This calculation is performed based on the fact that the RGB output values vary continuously with variation of the gradient. In this calculation, the chromaticities need not to be made exactly the same, that is, the chromaticities may be regarded as the same if the color difference therebetween is within an allowable color difference range that has been set in advance.

In step 156, calibration tables for black (K), magenta (M) and yellow (Y) are created using the gradients of C, M and Y respectively that have been calculated in step 155. The calibration tables are created in the following way. If for example, the gradients of C, M and Y of the CMY process gray that has the chromaticity same as that of the gray patch by black (K) of gradient 100 formed in step 154 are C140, M120 and Y80, the calibration tables for K, M and Y are created in such a way that K100 is converted into K'140 by the calibration table for K, M120 is converted into M'140 by the calibration table for M, and Y80 is converted into Y'140 by the calibration table for Y respectively. The same process is also performed for each of the gray patches of other gradients. Thus, the calibration tables for M, Y and K are created.

In step 157, an unfixed patch pattern for density-gradation characteristics control including monochromatic gradation patches of magenta (M), yellow (Y) and black (K) is formed using the calibration tables for M, Y and K created in step 156. Then density thereof is detected by the density sensor, and the detected density-gradation characteristics are set as target density-gradation characteristics for respective colors of M, Y and K.

Steps 158 and 159 correspond to the monochromatic control process. Between steps 157 and 158, normal printing operations are performed.

In step 158, monochromatic gradation patches of C, M, Y and K are formed on the intermediate transferring member, and the density thereof is detected by the density sensor.

In step 159, the differences of the detected density-gradation characteristics relative to the target density-gradation characteristics of cyan (C) set in step 151 and the target density-gradation characteristics of magenta (M), yellow (Y) and black (K) created in step 156 are calculated, and the calibration tables for the respective colors are updated in such a way that the density-gradation characteristics coincide with the targets. The method for updating each of the calibration tables for cyan (C), magenta (M), yellow (Y) and black (K) is the same as that of the calibration table for cyan (C) performed in step 153.

Between steps 159 and 160, normal printing operations are performed. In step 160 it is determined whether or not the monochromatic control process has been performed a predetermined number of times since the latest mixed color control process up to now. When it is determined that the monochromatic control process has been performed the predetermined number of times, the process returns to step 152. On the other hand, when it is determined that the monochromatic control process has not been performed the predetermined number of times yet, the process returns to step 158.

In connection with this, the process may be arranged to return to the mixed color control process of step 152 when changes in conditions of the color image forming apparatus such as the turning-on of the power, environmental variations or replacement of expendable supplies occur, even if the monochromatic control process has not been performed the predetermined number of times yet.

If the density sensor can output color difference relative to a specific type of paper as well as density, the process may be arranged to control color difference-gradation characteristics relative to the specific type of paper instead of controlling the density-gradation characteristics. In that case, the forgoing description of the control process also applies by interpreting the density as the color difference relative to the specific type of paper. In that case, it is possible to obtain gradation characteristics that are more matched with the characteristics of the human visual sense.

If the color sensor can output absolute chromaticity, the process may be arranged to calculate, in step 155, the gradients of cyan (C), magenta (M) and yellow (Y) of the CMY process grays that have the chromaticities same as those of the gray patches by black (K) of respective gradients by making use of absolute chromaticities of the gray patches by black (K) and the CMY process gray patches.

Furthermore, the process of updating the calibration table for cyan (C) in steps 152 to 153 may be performed by forming gradation patches by cyan (C) on a transferring material, detecting the absolute chromaticities thereof by the color sensor, and calculating differences between the detected color difference-gradation characteristics relative to the patches and a specified paper and target color difference-gradation characteristics with respect to cyan (C) set in step 151, like the process described in Embodiment 2.

As per the above, in this embodiment a combination of the mixed color control process and monochromatic control process is adopted using the color sensor and density sensor, and so it can provide advantageous effects similar to Embodiments 1 and 2. In addition, in this embodiment, the target density-gradation characteristics that is set first is directed to either one of cyan C), magenta (M) and yellow (Y) instead of black (K). This is advantageous when the density sensor or the color sensor has a higher accuracy in measuring cyan (C), magenta (M) or yellow (Y) than in measuring black (K). Thus, a color image forming apparatus with high color reproducibility in which the hue of images is unlikely to vary can be provided.

Embodiment 4

Figures 13, 13A:
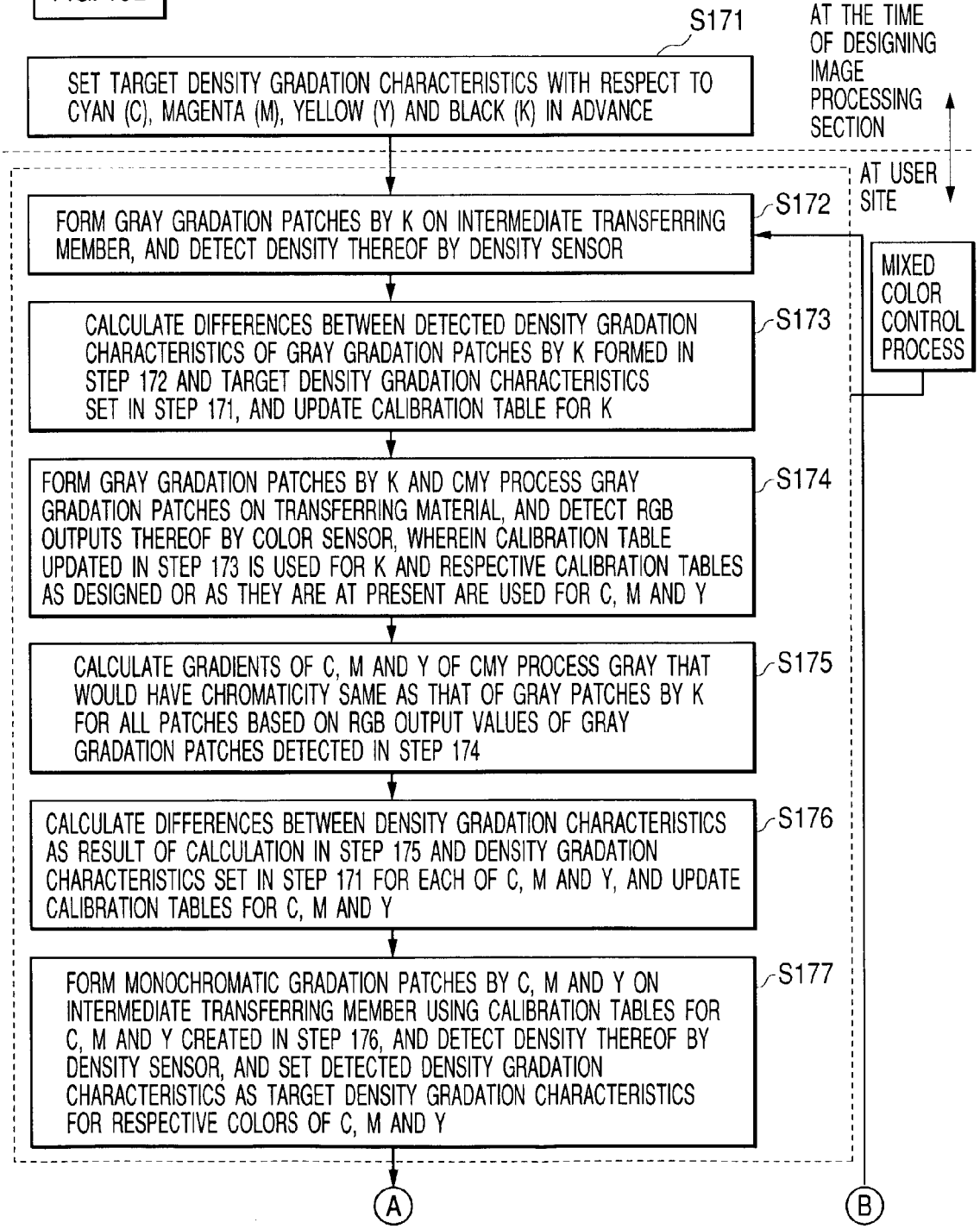
FIG. 13 which is composed of FIGS. 13A and 13B are flow charts specifically showing a density-gradation characteristics control process in Embodiment 4 which a mixed color control process and a monochromatic control process are used in combination.
Figure 13B:
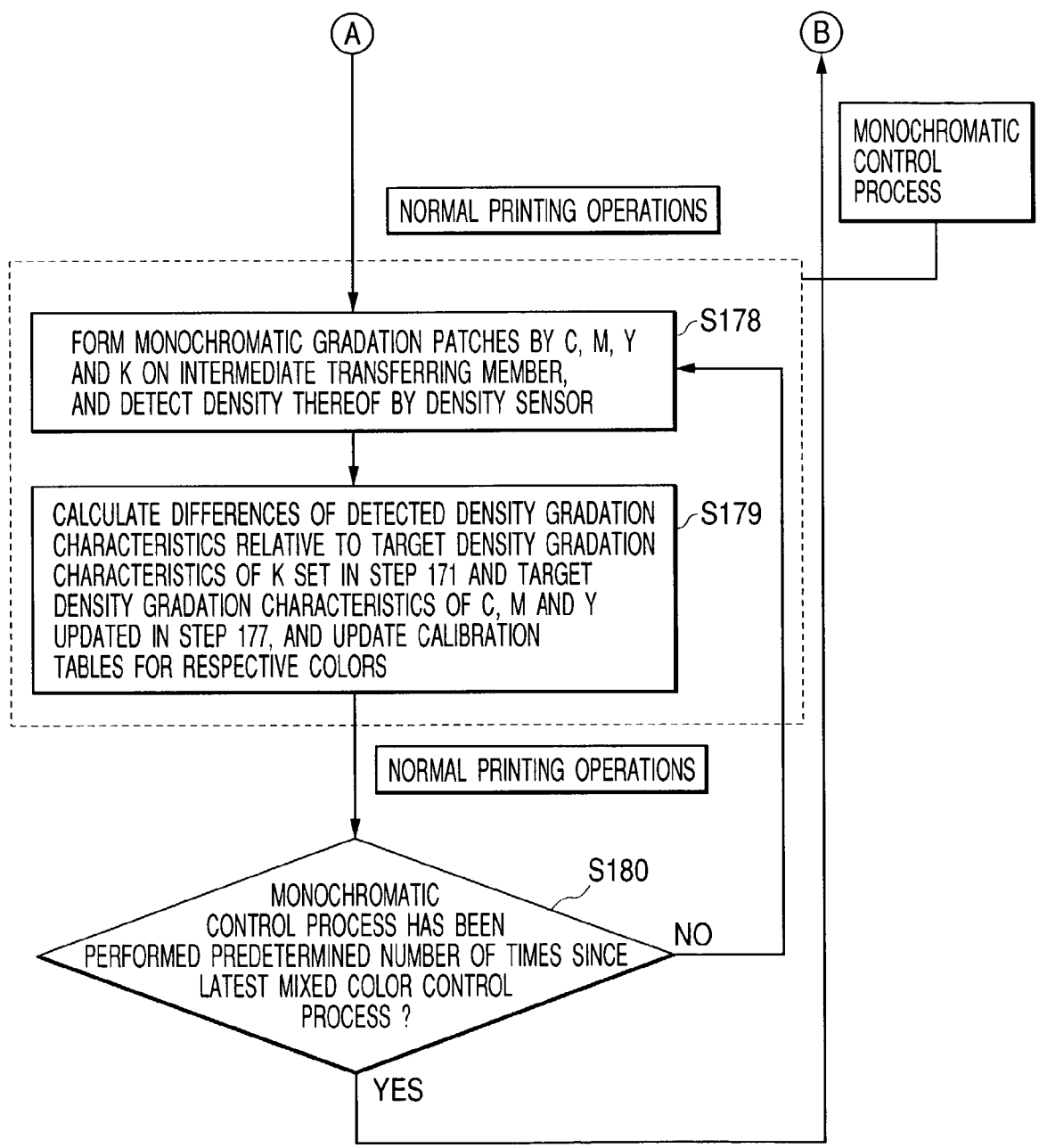

FIGS. 13A and 13B are flow charts specifically showing a process for controlling density-gradation characteristics according to Embodiment 4. This process includes the mixed color control process and the monochromatic control process in combination. This embodiment differs from Embodiment 1 in that the target density-gradation characteristics are set in advance for cyan (C), magenta (M), yellow (Y) and black (K).

In step 171, target density-gradation characteristics with respect to cyan (C), magenta (M), yellow (Y) and black (K) are set in advance. This setting is made at the time of designing the image processing section or at the time of shipping the color image forming apparatus.

The subsequent steps are performed at a user site at which the color image forming apparatus is installed. Steps 172 to 177 correspond to the mixed color control process.

In step 172, black (K) gradation patches are formed on the intermediate transferring member, and the density thereof is detected by the density sensor.

In step 173, the differences between the detected density-gradation characteristics of the black (K) gradation patches and the target density-gradation characteristics set in step 171 are calculated, and the calibration table for correcting the density-gradation characteristics of black (K) in the image processing section is updated in such a way that the density-gradation characteristics coincide with the target. The method for updating the calibration table is the same as that in Embodiment 1.

Next, in step 174, a pattern used for controlling density-gradation characteristics in which gray gradation patches by black (K) and CMY process gray gradation patches are formed and fixed is output, and after its passing through the fixing device 30, the RGB outputs of the patches are detected by the color sensor 42. Upon the formation of the gray patches, the calibration table updated in step 173 is used for black (K), and the respective calibration tables at the time of designing or as they stand at that time are used for cyan (C), magenta (M) and yellow (Y).

In step 175, the gradients of cyan (C), magenta (M) and yellow (Y) of the CMY process grays that would have the chromaticities same as those of the gray patches by black (K) of respective gradients are calculated based on the RGB output values of the gray gradation patches by black (K) and the CMY process gray gradation patches detected in step 174. This calculation is performed based on the fact that the RGB output values vary continuously with variation of the gradient. In this calculation, the chromaticities need not to be made exactly the same, that is, the chromaticities may be regarded as the same if the color difference therebetween is within an allowable color difference range that has been set in advance.

In step 176, the calibration tables for cyan (C), magenta (M) and yellow (Y) are updated using the gradients of C, M and Y respectively that have been calculated in step 175. The calibration tables are updated in the following way. If for example, at the time of designing the image processing section the gradients of C, M and Y of the CMY process gray that has the chromaticity same as that of the gray patch by black (K) of gradient 100 are designed to be C140, M 120 and Y80, while the gradients of C, M and Y of the CMY process gray that has the chromaticity same as that of the gray patch by black (K) of gradient 100 calculated in step 175 are C135, M125, and Y90, then the calibration tables for C, M and Y are made up in such a way that C140 is converted into C'135 by the calibration table for C, M120 is converted into M'125 by the calibration table for M, and Y80 is converted into Y'90 by the calibration table for Y respectively. The same process is also performed for each of the gray patches of other gradients. Thus, the calibration tables for C, M and Y are updated.

In step 177, an unfixed patch pattern for density-gradation characteristics control including monochromatic gradation patches of cyan (C), magenta (M) and yellow (Y) is formed using the calibration tables for C, M and Y updated in step 176. Then, density thereof is detected by the density sensor, and the detected density-gradation characteristics are set as target density-gradation characteristics for respective colors of C, M and Y.

Steps 178 and 179 correspond to the monochromatic control process. Between steps 177 and 178, normal printing operations are performed.

In step 178, monochromatic gradation patches of C, M, Y and K are formed on the intermediate transferring member, and the density thereof is detected by the density sensor.

In step 179, the differences of the detected density-gradation characteristics relative to the target density-gradation characteristics of black (K) set in step 171 and the density-gradation characteristics of cyan (C), magenta (M) and yellow (Y) updated in step 176 are calculated, and the calibration tables for the respective colors are updated in such a way that the density-gradation characteristics coincide with the targets. The method for updating each of the calibration tables for cyan (C), magenta (M), yellow (Y) and black (K) is the same as that of the calibration table for black (K) performed in step 173.

Between steps 179 and 180, normal printing operations are performed. In step 180 it is determined whether or not the monochromatic control process has been performed a predetermined number of times since the latest mixed color control process up to now. When it is determined that the monochromatic control process has been performed the predetermined number of times, the process returns to step 172. On the other hand, when it is determined that the monochromatic control process has not been performed the predetermined number of times yet, the process returns to step 178.

In connection with this, the process may be arranged to return to the mixed color control process of step 172 when changes in conditions of the color image forming apparatus such as the turning-on of the power, environmental variations or replacement of expendable supplies occur, even if the monochromatic control process has not been performed the predetermined number of times yet.

If the density sensor can output color difference relative to a specific type of paper as well as density, the process may be arranged to control color difference-gradation characteristics relative to the specific type of paper instead of controlling the density-gradation characteristics. In that case, the forgoing description of the control process also applies by interpreting the density as the color difference relative to the specific type of paper. In that case, it is possible to obtain gradation characteristics that are more matched with the characteristics of the human visual sense.

If the color sensor can output absolute chromaticity, the process may be arranged to calculate, in step 175, the gradients of cyan (C), magenta (M) and yellow (Y) of the CMY process grays that have the chromaticities same as those of the gray patches by black (K) of respective gradients by making use of absolute chromaticities of the gray patches by black (K) and the CMY process gray patches.

The process of updating the calibration table for black (K) in steps 172 to 173 may be performed by forming gradation patches by black (K) on a transferring material, like the process described in Embodiment 2.

As per the above, in this embodiment, a combination of the mixed color control process and monochromatic control process is adopted using the color sensor and the density sensor, so that the density-gradation characteristics can be controlled with a good efficiency in the interior of individual color image forming apparatus, while efficiently suppressing consumption of the transferring materials and toner. In this embodiment, the density-gradation characteristics of C, M, and Y are matched with the density-gradation characteristics of K, so the gray balance can be stabilized. Even when environmental variations that would vary the density-gradation characteristics occur, the hue of images is unlikely to vary, since the gradation-density characteristics of C, M, Y and K vary keeping in line with each other. In addition, since the target density-gradation characteristics are set in advance for C, M and Y, good monochromatic gradation characteristics can be realized. Therefore, a color image forming apparatus that has high color reproducibility can be provided.

According to Embodiments 1 to 4 of the invention, the number of times of density-gradation characteristics control process using the color sensor is reduced by using the color sensor and density sensor in combination, so that consumption of the transferring materials can be suppressed. In addition, it is possible to perform, in the interior of an individual gray image forming apparatus, such density-gradation characteristics control process that is superior in that gray balance of tertiary color is taken into consideration, as compared to conventional density-gradation characteristics control process that uses only a density sensor.

Embodiment 5

The structure of the color image forming apparatus according to this embodiment is the same as that of Embodiment 1.

Figures 15, 15A:
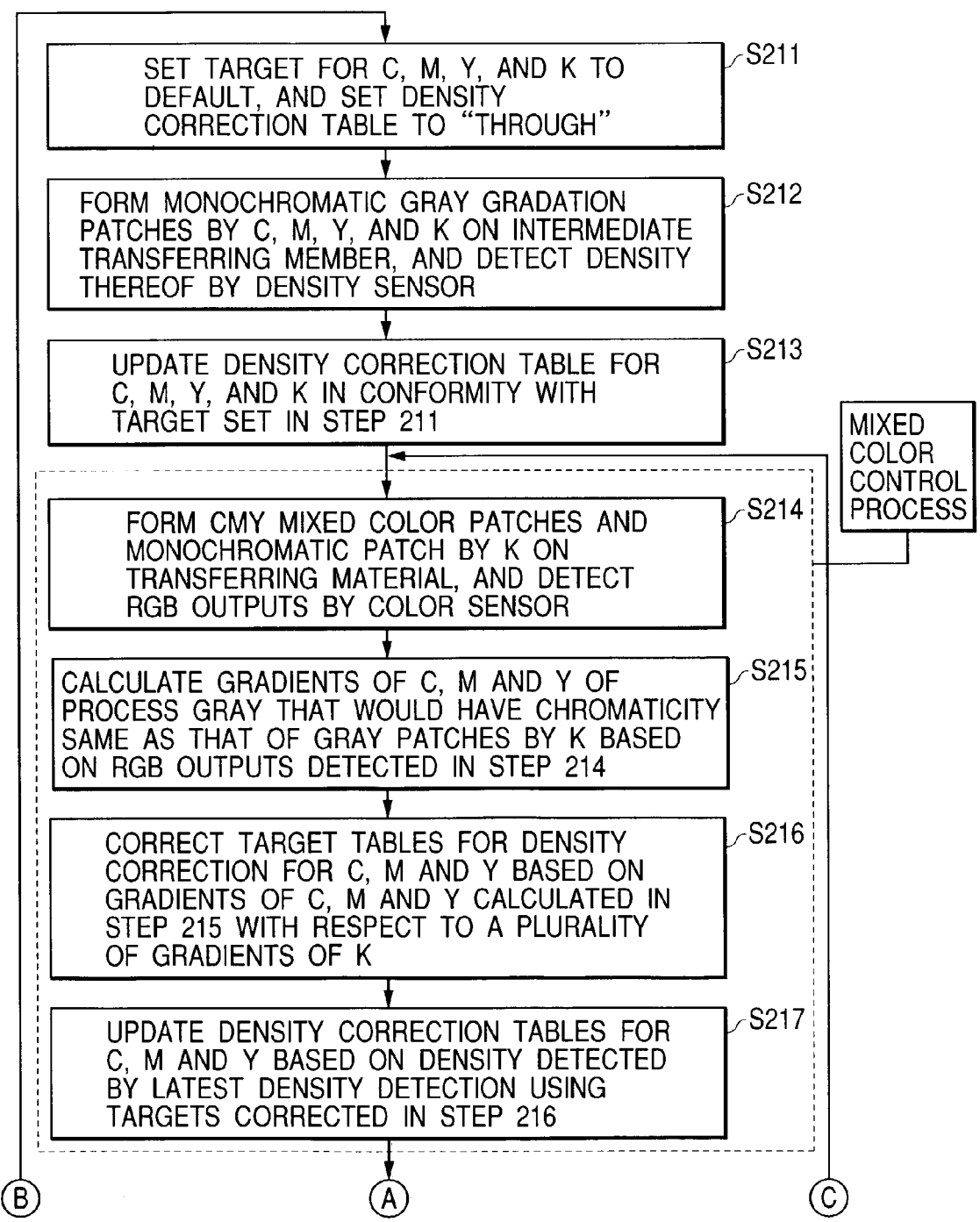
FIG. 15 which is composed of FIGS. 15A and 15B are flow charts specifically showing a gradation-density characteristics control process in Embodiment 5.
Figure 15B:
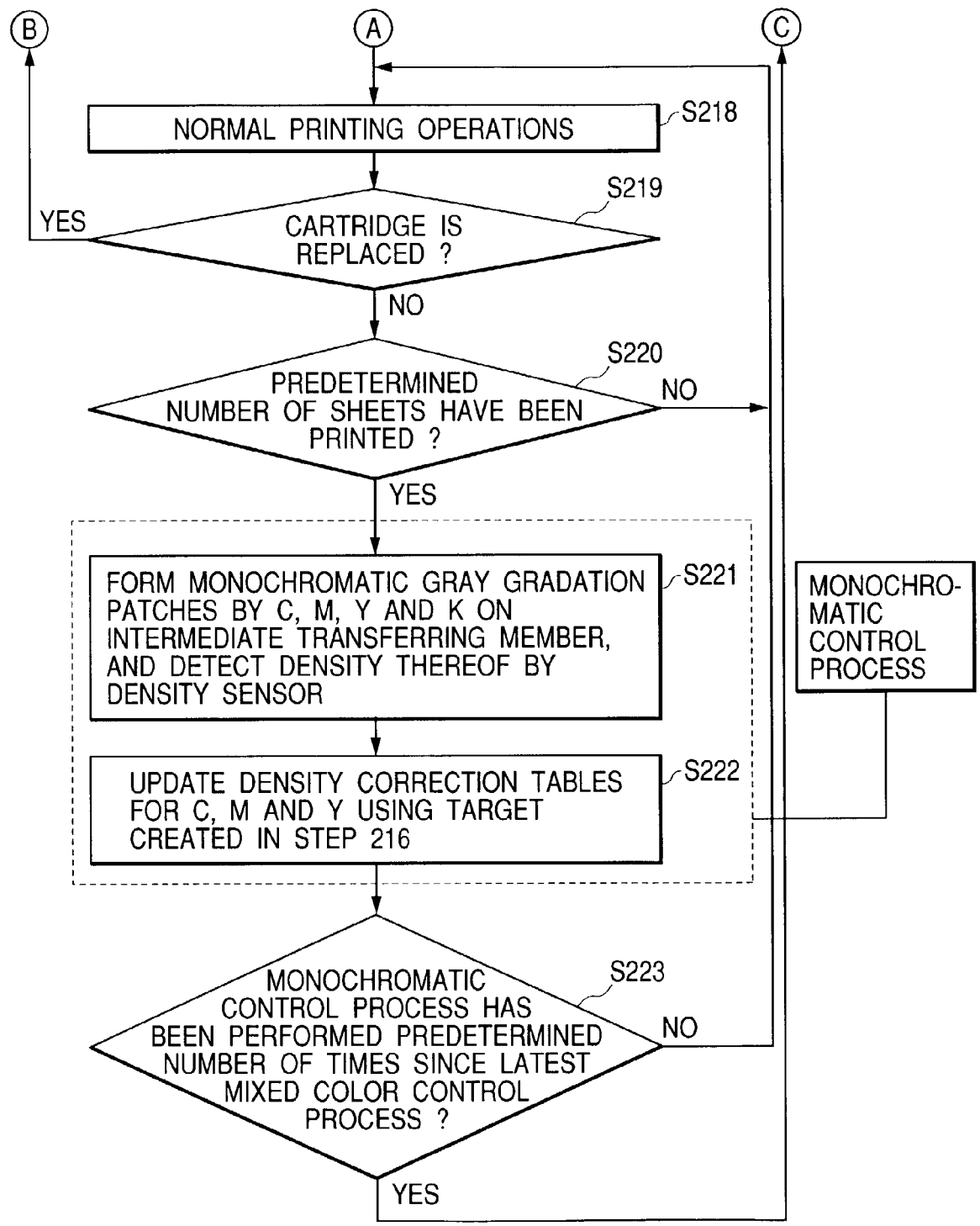

FIGS. 15A and 15B are flow charts specifically showing a process for controlling gradation-density characteristics according to this embodiment. This process includes the mixed color control process and the monochromatic control process in combination.

Figure 16:
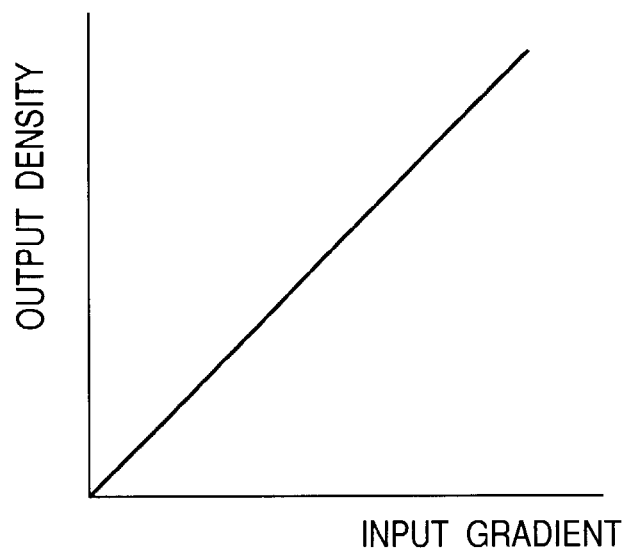
FIG. 16 is a graph showing a default gradation-density characteristics curve.

First, when a new cartridge is used, in other words, when the color image forming apparatus is first installed, or when the cartridge is replaced (or changed), a default gradation-density curve that has been defined in advance is used as target gradation-density characteristics for respective colors of cyan (C), magenta (M), yellow (Y) and black (K) in step 211. The default gradation-density curve is set taking into account characteristics of the color image forming apparatus. In this embodiment, such a default gradation-density curve in which the relationship between input gradient and output density is linear as shown in FIG. 16 is used. As a density correction table, a so-called through-table that does not vary input values is used.

Figure 17:
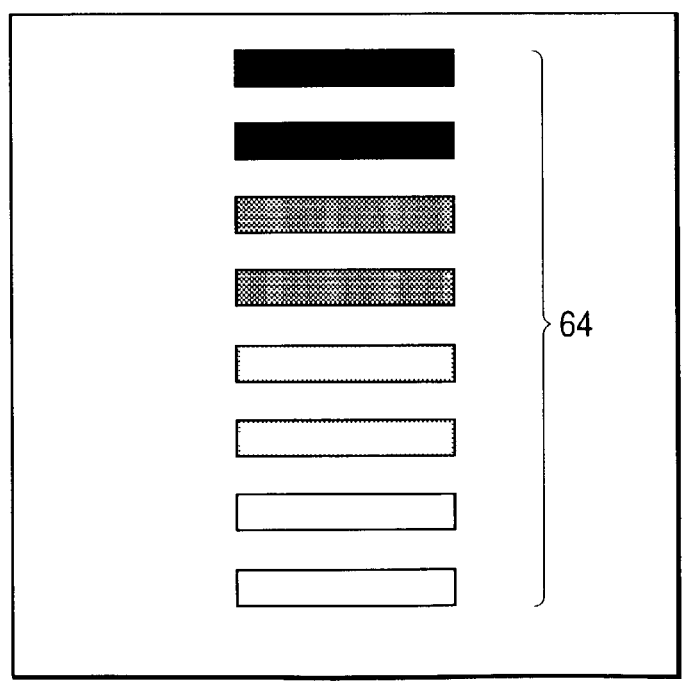
FIG. 17 illustrates a patch pattern to be formed on an intermediate transferring member.

In step 212, a patch pattern is formed on the intermediate transferring member, and it is read or detected by the density sensor. An example of the patch pattern is shown in FIG. 17. In the patch pattern, monochromatic gradation patches 64 of unfixed black (K) toner are arranged in series. After the toner patches by the black (K) toner are formed, monochromatic toner patches (not shown) of the cyan (C), magenta (M) and yellow (Y) toners are subsequently formed. The gradients of C, M, Y and K for forming the patches are determined in advance.

The density of the patch pattern formed on the intermediate transferring member is detected by the density sensor. Based on the detected density, a gradation-density curve is created using an interpolation. If for example, the detected density is represented as dots in a graph shown in FIG. 18, a gradation-density curve denoted by reference numeral 100 is formed by an interpolation (e.g. linear interpolation). Furthermore, a curve 200 of the inverse property is created by calculation using the target density curve 300 set in step 211 as the reference. The inverse curve 200 is used as a density correction table for input image data. By converting the input image data using this density correction table, the input gradient and the output density come to a relationship represented by the target gradation-density curve 300 (step 213).

In step 214, a patch pattern including mixed color patches formed by cyan (C), magenta (M) and yellow (Y) and a monochromatic patch formed by black (K) is formed on a transferring material using the density correction table 200 created in step 213, and the patch pattern is detected by the color sensor. The details of this step are as follows.

Figures 18, 19:
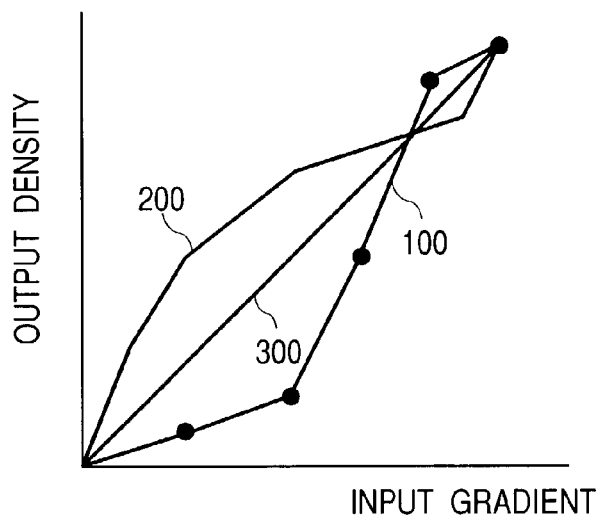
FIG. 18 is a graph illustrating a method for controlling gradation-density characteristics based on outputs of the density sensor.
FIG. 19 is a table showing data of a patch pattern to be formed on a transferring material.

The CMY mixed color patch and monochrome K patch, (1) to (9) correspond to data shown in FIG. 19, in which the data of the patches (1) to (8) include data with respect to C, M and Y and the data of the patch (9) include monochromatic data of K. The gradients of C, M and Y in each of the patches are set as a combination of gradients C0±α, M0±α and Y0±α, where C0, M0 and Y0 are reference gradients (which will be referred to as reference values hereinafter) of cyan (C), magenta (M) and yellow (Y) respectively and α represents a variation from the reference values. The patch (9) is the monochromatic black (K) patch, which is formed with a predetermined gradient K0. The values of C0, M0, Y0 and K0 are so determined that the mixed color corresponding to the combination of C0, M0 and Y0 would become the color same as the color corresponding to K0 under the condition in which the gradation-density characteristics of C, M, Y and K are adjusted to the state of default gradation-density curve 300 and the colors are formed under a normal image forming condition. These values are set at the time of designing color processing and halftone. The patches (1) to (9) are formed on the transferring material in a manner shown in FIG. 20. The patches formed on the transferring material are detected, after their passing through the fixing unit 30, by the color sensor 42, so that RGB values are output.

Next, in step 215, values (i.e. gradients) of C, M and Y with which CMY process gray would coincide with the color of the K patch (9) are calculated based on the RGB outputs of the sensor.

Figure 21:
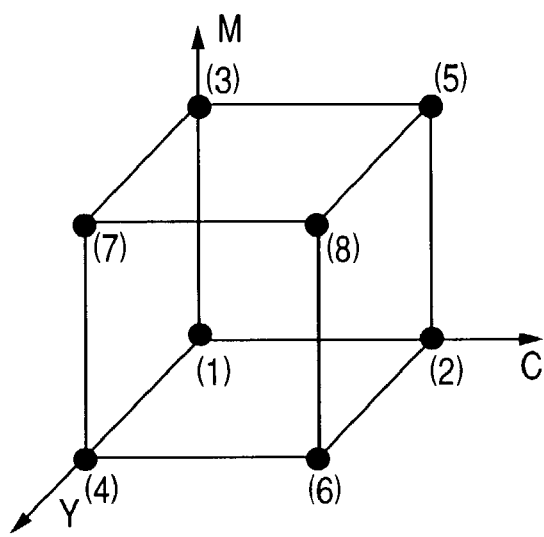
FIG. 21 is a graph showing the C, M and Y coordinates of patches to be formed on the transferring material.

If the image forming conditions at that time are exactly the same as the conditions assumed at the time of designing the color processing, the color corresponding to K0 coincides with the mixed color corresponding to (C0, M0, Y0). But in practice, they do not coincide with each other for the reasons mentioned in the description of the related art, and so there is a color difference. In the following, the RGB outputs for the respective patches (1) to (8) are represented as (1): (r1, g1, b1), (2): (r2, g2, b2), . . . , and (8): (r8, g8, b8). The C, M and Y coordinates of the patches (1) to (8) are shown three dimensionally in FIG. 21. In FIG. 21, the coordinates of the center of the cubic lattice are (C0, M0, Y0).

Based on the RGB values of the patches (1) to (8), values of C, M and Y with which the RGB values of the process gray would coincide with the RGB values of the patch formed by K0 are calculated from a linear interpolation based on eight points as shown in FIG. 21. Specifically, RGB values (Rcmy, Gcmy, Bcmy) corresponding to the coordinates C, M, and Y of points included in the cubic lattice shown in FIG. 21 are obtained based on the calculation formulated as follows:

$$Rcmy=[(C-C0+\alpha)(M-M0+\alpha)(Y-Y0+\alpha)r1+(C0+\alpha-C)\\(M-M0+\alpha)(Y-Y0+\alpha)r2+(C-C0+\alpha)(M0+\alpha-M)\\(Y-Y0+\alpha)r3+(C-C0+\alpha)(M-M0+\alpha)(Y0+\alpha-Y)r4+\\(C0+\alpha-C)(M0+\alpha-M)(Y-Y0+\alpha)r5+(C0+\alpha-C)\\(M-M0+\alpha)(Y0+\alpha-Y)r6+(C-C0+\alpha)(M0+\alpha-M)\\(Y0+\alpha-Y)r7+(C0+\alpha-C)(M0+\alpha-M)(Y0+\alpha-Y)r8]/\\(8\alpha3);$$

Gcmy and Bcmy are also calculated by similar formulas. Then the difference between the calculated (Rcmy, Gcmy, Bcmy) and the RGB values (Rk, Gk, Bk) of K is calculated as, for example, a sum of squares of differences. And the (Rcmy, Gcmy, Bcmy) having the least difference from the (Rk, Gk, Bk), that is, the (Rcmy, Gcmy, Bcmy) that is closest to the (Rk, Gk, Bk) is determined, so that the values of C, M and Y corresponding thereto are taken as optimum values (C0', M0', Y0').

In the above process, it is desirable that the size of the cubic lattice is as small as possible in order to increase the accuracy of the interpolation. On the other hand, when the difference between the color of K0 and the color of (C0, M0, Y0) is large, the point (C0', M0' Y0') does not exist in the neighborhood of the center (C0, M0, Y0) of the cubic lattice, and even in that case, the point (C0', M0' Y0') must be included in the cubic lattice. For that purpose, the size of the cubic lattice should be sufficiently large. The value $\alpha$ is optimally set taking into account the above two situations.

Figure 22:
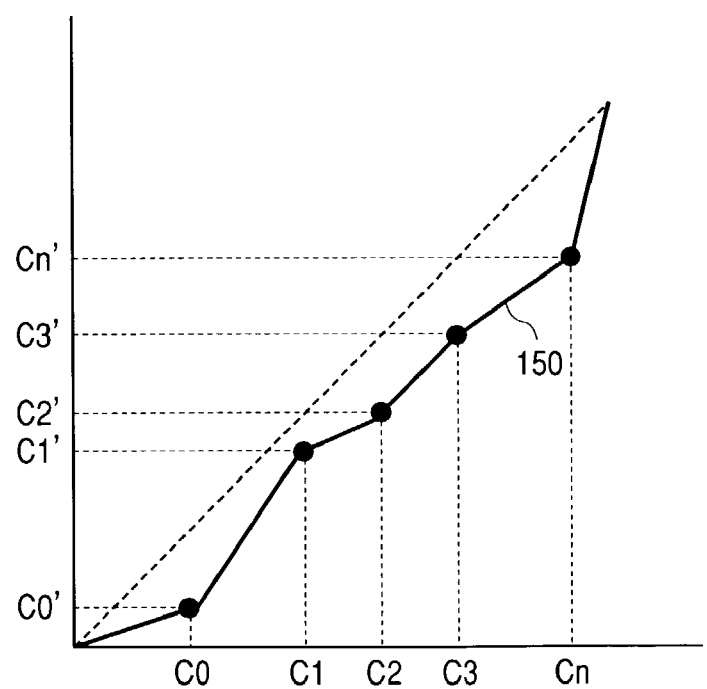
FIG. 22 is a graph illustrating a method for controlling gradation-density characteristics based on outputs of the color sensor.

Furthermore, the gradient of K is varied and sets of patches (1) to (9) similar to the above patches having different reference values (CN, MN, YN, KN) (where, N=0, 1, 2, . . . , n) are formed, and values (CN', MN', YN', KN') corresponding to the respective values (CN, MN, YN, KN) are determined. In FIG. 22, an example of the relationship thus obtained between the (CN, MN, YN) and (CN', MN', YN') is shown with respect to cyan as black dots. Values between the dots are linearly interpolated to form a curve (i.e. color correction table) 150.

Figure 23:
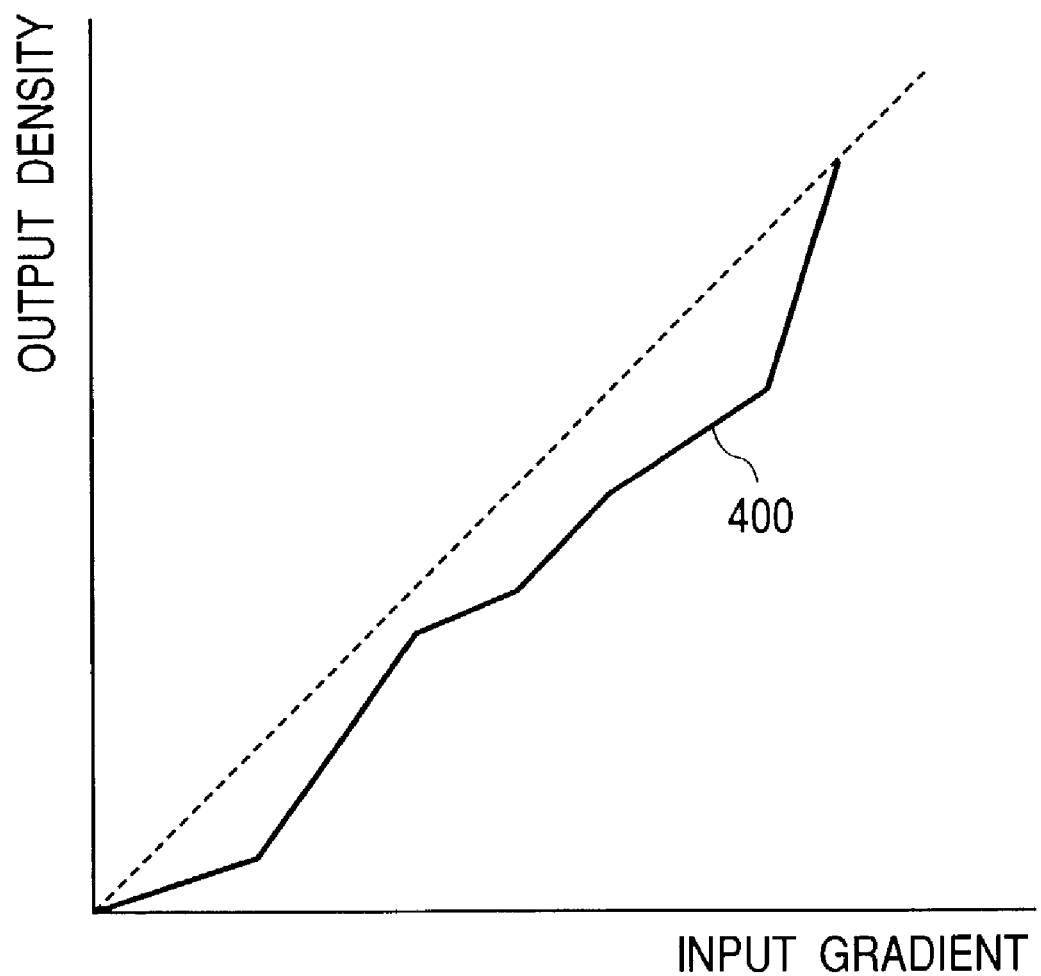
FIG. 23 is a graph showing target gradation-density characteristics.

Next, in step 216, the target table for density correction is updated. Namely, a gradation-density curve that is the original target gradation-density curve (denoted by reference numeral 300 in FIG. 18) times the color correction table 150 shown in FIG. 22 is formed and set as a new target gradation-density curve for cyan (denoted by reference numeral 400 in FIG. 23). Specifically, an input gradient is converted by the color correction table 150 first, and then converted into an output density in accordance with the target gradation-density curve.

The targets for magenta (M) and yellow (Y) are also changed in the same manner. With density correction using these new targets, the mixed color corresponding to (CN, MN, YN) coincides with the color corresponding to KN.

In connection with this, the human visual sense is sensitive to gray in a highlight area, but less sensitive to gray in a shadow area. In addition, since in the normal color processing, a UCR processing (that is, such a processing in which a portion of CMY is replaced by K upon separating color) is used, gray produced only by the three colors of C, M and Y does not appear in the shadow area. In view of the two facts, it is preferable that the values of (CN, MN, YN, KN) be selected principally in the highlight area, in order that the invention can be more effectively carried out.

In step 217, density correction tables are newly created based on the results of the density detection in step 212 using the targets for C, M and Y that have been updated in step 216. In the subsequent printing operations, the density correction of input image data is effected using these density correction tables. In step 218, the process enters a normal printing state.

After printing is carried out on a predetermined number of sheets in the normal printing state (step 220), the process enters the monochromatic control process. In the monochromatic control process, a patch pattern is formed on the intermediate transferring member, and it is read or detected by the density sensor in step 221 in a manner similar to the process in step 212. Density of the patch pattern formed on the intermediate transferring member is detected by the density sensor.

Based on the detected densities, gradation-density curves are created using an interpolation, and the density correction tables are updated using the targets 400 created in step 216 in a manner similar to the process in step 213 (step 222).

In step 223, it is determined whether or not the monochromatic control process has been performed a predetermined number of times. When it is determined that the monochromatic control process has not been performed the predetermined times yet, the process returns to the normal printing state. On the other hand, when it is determined that the monochromatic control process has been performed the predetermined times, the process return to step 214, in which a patch pattern including mixed color patches by C, M and Y and a monochromatic patch by K is formed on the transferring material and detected by the color sensor. This patch pattern is formed using the newest (or most up-to-date) density correction tables. After that, the processes in the subsequent steps that have been described above are performed. In connection with this, new targets are created by multiplying the targets 400 created in step 216 by new inverse tables.

When a cartridge of any color is replaced during the normal printing state (step 219), the process returns to step 211 since the image forming conditions vary greatly with the replacement of the cartridge.

In this embodiment, the process is so arranged that the targets are corrected as described above giving importance to accuracy, but it may be arranged in such a way that the density correction table is multiplied by the correction table 150 shown in FIG. 22 without correcting the target after making of the density correction table.

In this embodiment a three dimensional liner interpolation is used for calculating the optimum values of C, M and Y, but other interpolation methods such as approximations using a second-order function or a third-order function, or a non-linear interpolation like a spline interpolation may be used.

In this embodiment the same value for $\alpha$ is set for C, M and Y, but the value of $\alpha$ may differ between among the colors.

In this embodiment, the color sensor outputs RGB values, but other types of color sensor may be used such as a sensor outputting chromaticities such as L*a*b* values, L*c*h* values or XYZ etc.

In this embodiment, the process is so arranged to match the color of the mixed color patch by C, M and Y with the color of the K patch, but it may be so arranged to measure L*a*b* values or the like of the mixed color patch by C, M and Y by use of the color sensor and calculate optimum gradients with which the mixed color by C, M and Y would become achromatic using the achromatic axis of a=0 and b=0 as a target so as to feed back the result to the monochromatic control process.

Embodiment 6

Figures 24, 24A, 24B:
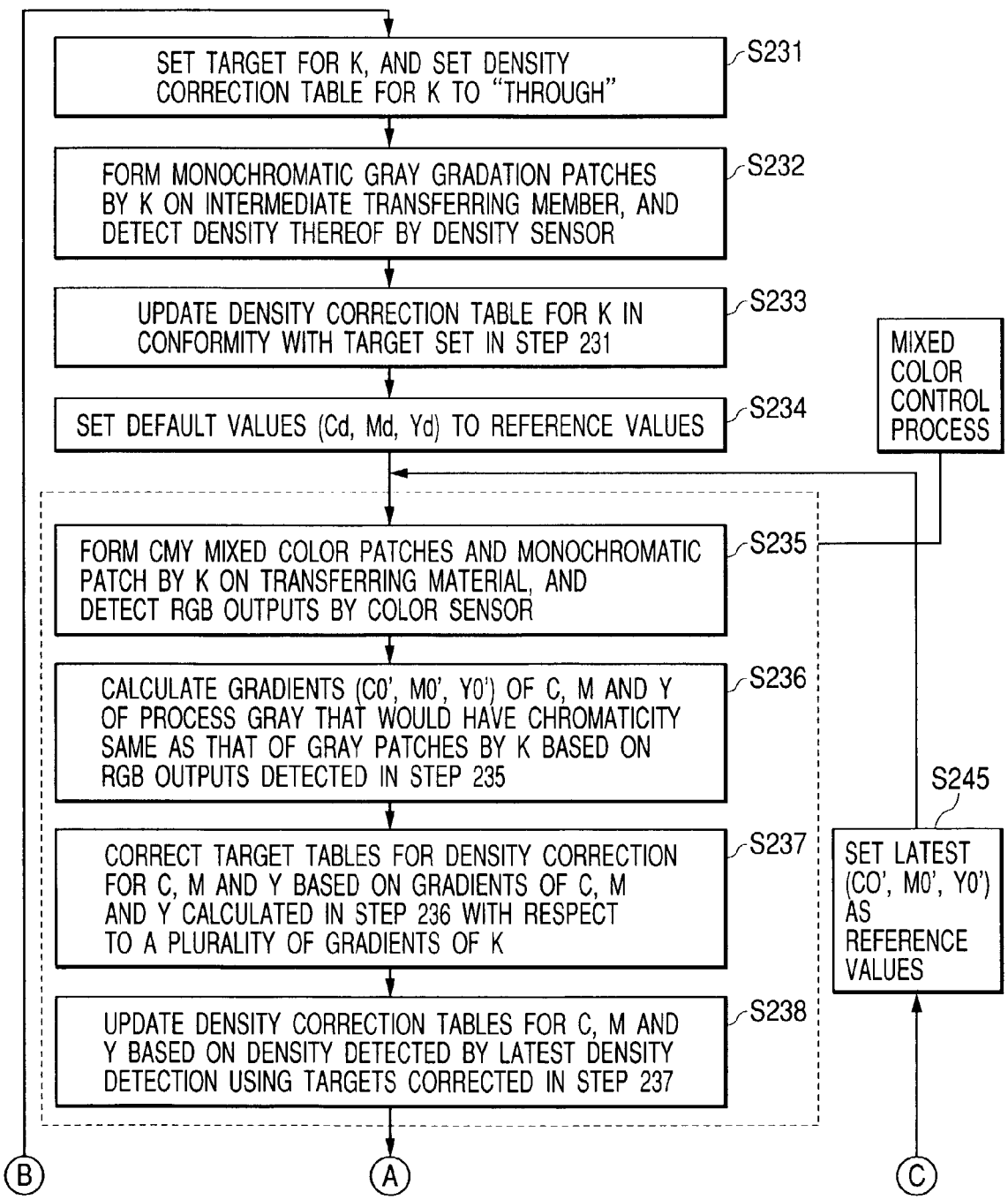
FIG. 24 which is composed of FIGS. 24A and 24B are flow charts specifically showing a gradation-density characteristics control process in a sixth embodiment.
Figure 24B:
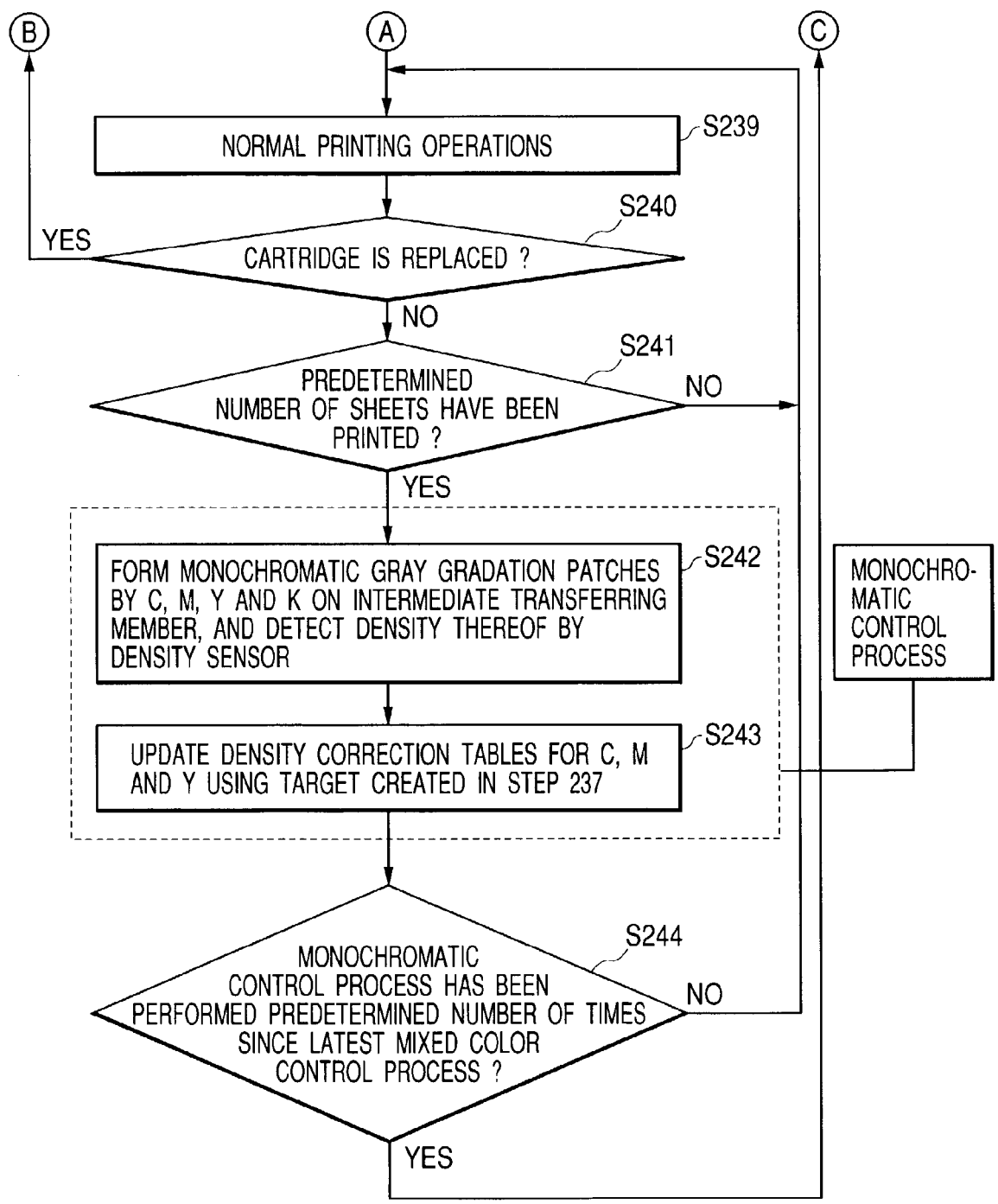

The structure of the color image forming apparatus according to this embodiment is the same as that of Embodiment 1. FIGS. 24A and 24B are flow charts specifically showing a control process in this embodiment.

First, when a new cartridge is used, in other words, when the color image forming apparatus is newly installed or when the cartridge is replaced, a gradation-density curve that has been defined in advance is used as target gradation-density characteristics for black (K) in step 231. The default gradation-density curve is set taking into account characteristics of the color image forming apparatus. In this embodiment, such a gradation-density curve in which the relationship between input gradient and output density is linear as shown in FIG. 16 is used. As a density correction table 133, a so-called through-table that does not vary input values is used.

In step 232, a patch pattern is formed on the intermediate transferring member, and it is read or detected by the density sensor. The patch pattern to be formed on the intermediate transferring member is similar to that of Embodiment 5 shown in FIG. 17, but in this embodiment the patch pattern is comprised of monochromatic patches of only unfixed black (K) toner. The gradients of K for forming the patches are determined in advance.

The density of the patch pattern formed on the intermediate transferring member is detected by the density sensor. Based on the detected density-gradation-density curves are created using an interpolation. If for example, the detected density is represented as dots in a graph shown in FIG. 18, a gradation-density curve denoted by reference numeral 100 is formed by an interpolation (e.g. linear interpolation). Furthermore, a curve 200 of the inverse property is created by calculation using the target density curve as the reference. The inverse curve 200 is set as a density correction table for input image data. By converting the input image data using this density correction table, the input gradient and the output density come to a relationship represented by the target gradation-density curve 300 (step 233).

In step 234, predetermined default values (Cd, Md, Yd) are set as reference values (C0, M0, Y0) of patches used in the next mixed color control process.

In step 235, a patch pattern including mixed color patches formed by cyan (C), magenta (M) and yellow (Y) and a monochromatic patch formed by black (K) is formed on a transferring material and the patch pattern is detected by the color sensor. Upon forming the patch pattern, the density correction table 300 made in step 233 is used for K and the through-table is used for C, M and Y.

Figures 25, 26:
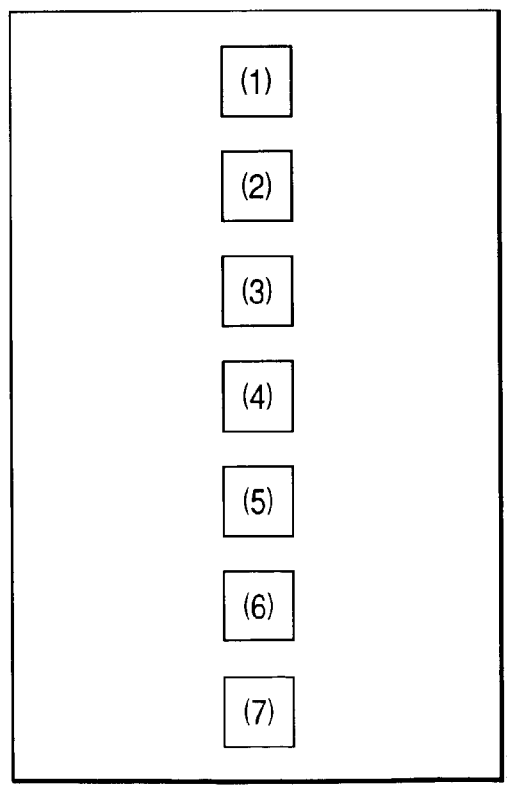
FIG. 25 is a table showing data of a patch pattern to be formed on a transferring material.
FIG. 26 illustrates the patch pattern to be formed on the transferring material.

The details of this step 235 are as follows. The CMY mixed color patch and monochrome K patch (1) to (7) correspond to data shown in FIG. 25, in which the data of the patches (1) to (6) include data with respect to C, M and Y and the data of the patch (7) include monochromatic data of K. The gradients of C, M and Y in each of the patches are set to C0, M0 and Y0 except that the gradient for one specific color is varied from the reference value by ±α. The patch (7) is the monochrome patch by black (K), which is formed at a predetermined gradient K0. As mentioned above, at first, the values of C0, M0 and Y0 are set to the default values Cd, Md, and Yd. These values Cd, Md, and Yd are such values with which mixed color corresponding to the combination of Cd, Md and Yd would become the color same as the color corresponding to K0 under the condition in which the density characteristics of K are adjusted to the state of gradation-density curve 300 and the gradation-density curves of C, M and Y are typical. The patches (1) to (7) are formed on the transferring material in a manner shown in FIG. 26. The patches formed on the transferring material are detected, after their passing through the fixing unit 30, by the color sensor 42, so that RGB values are output (step 235).

Next, in step 236, values (i.e. gradients) of C, M and Y with which CMY process gray would coincide with the color of the K patch are calculated based on the RGB outputs of the sensor.

Figure 27:
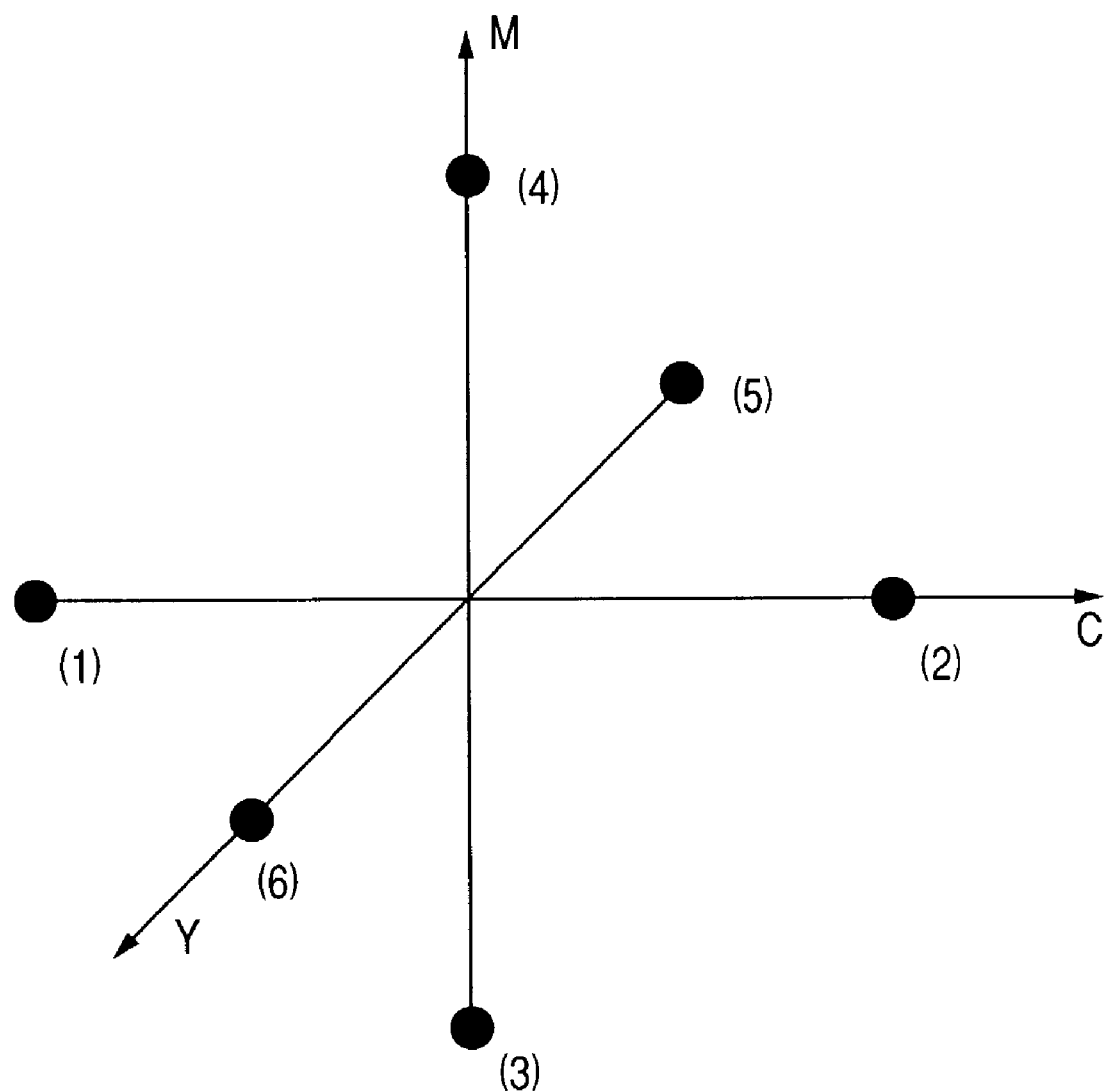
FIG. 27 is a graph showing the C, M and Y coordinates of patches to be formed on the transferring material.

If the image forming conditions at that time are exactly the same as the conditions assumed at the time of designing the color processing, the color corresponding to K0 coincides with the mixed color corresponding to (C0, M0, Y0). But in practice, they do not coincide with each other for the reasons mentioned in the description of the related art, and so there is a color difference. Here, it is assumed that the RGB outputs for the respective patches are represented as (1): (r1, g1, b1), (2): (r2, g2, b2), ... etc. The C, M and Y coordinates of the patches (1) to (6) are shown three dimensionally in FIG. 27. In FIG. 27, the coordinates of the intersecting points of the three axes are (C0, M0, Y0).

Based on the RGB values of the patches (1) to (6), values of C, M and Y with which the RGB values of the process gray would coincide with the RGB values of the patch formed by K0 are calculated from FIG. 27. Specifically, RGB values (Rc, Gc, Bc) with respect to C are obtained based on the linear interpolation according to the following formulas while varying the value of C on the axis between the points (1) and (2) in FIG. 27:

$$Rc=[(C-C0+\alpha)r1+(C0+\alpha-C)r2]/(2\alpha)$$

$$Gc=[(C-C0+\alpha)g1+(C0+\alpha-C)g2]/(2\alpha)$$

$$Bc=[(C-C0+\alpha)b1+(C0+\alpha-C)g2]/(2\alpha).$$

Then the difference between the calculated (Rc, Gc, Bc) and the RGB values (Rk, Gk, Bk) of K is calculated as, for example, a sum of squares of differences. And the (Rc, Gc, Bc) having the least difference from the (Rk, Gk, Bk), that is, the (Rc, Gc, Bc) that is closest to the (Rk, Gk, Bk) is determined, so that the value of C corresponding thereto is taken as an optimum value C0'.

As to M and Y, the optimum values M0' and Y0' are also obtained in the same manner, and the set of values (C0', M0', Y0') are taken as the optimum values for C, M and Y with which the color closest to the color corresponding to K0 is produced.

The process thereafter is similar to the process in Embodiment 5 shown in FIGS. 15A and 15B. In this embodiment, when the monochromatic control process has been performed a predetermined number of times (step 244), the optimum values (C0', M0', Y0') obtained by the latest mixed color control process are set as the reference values (C0, M0, Y0), in step 245.

Then the patches are formed using the new (updated) reference values (C0, M0, Y0), and the patches are detected by the color sensor (step 235).

When a cartridge of any color is replaced during the normal printing state (step 240), the process returns to step 231, and the mixed color control process is performed based on the default reference values (Cd, Md, Yd) again after the density control process for K.

As per the above, in this embodiment, the number of patches included in one set of mixed color patches is as small as seven, and so it is possible to form increased number of sets of patches on the transferring material. In addition, since the optimum values obtained in the latest process are set as the reference values, it is possible to enhance accuracy of the control process.

In this embodiment, the same value for $\alpha$ is set for C, M and Y like in Embodiment 5, but the value of $\alpha$ may differ among the colors.

Embodiment 7

The structure of the color image forming apparatus according to this embodiment is the same as that of Embodiment 1. While in Embodiments 5 and 6, the patch pattern for mixed color control process are formed only once, this embodiment is characterized in that the patch pattern is formed more than once.

Figure 28:
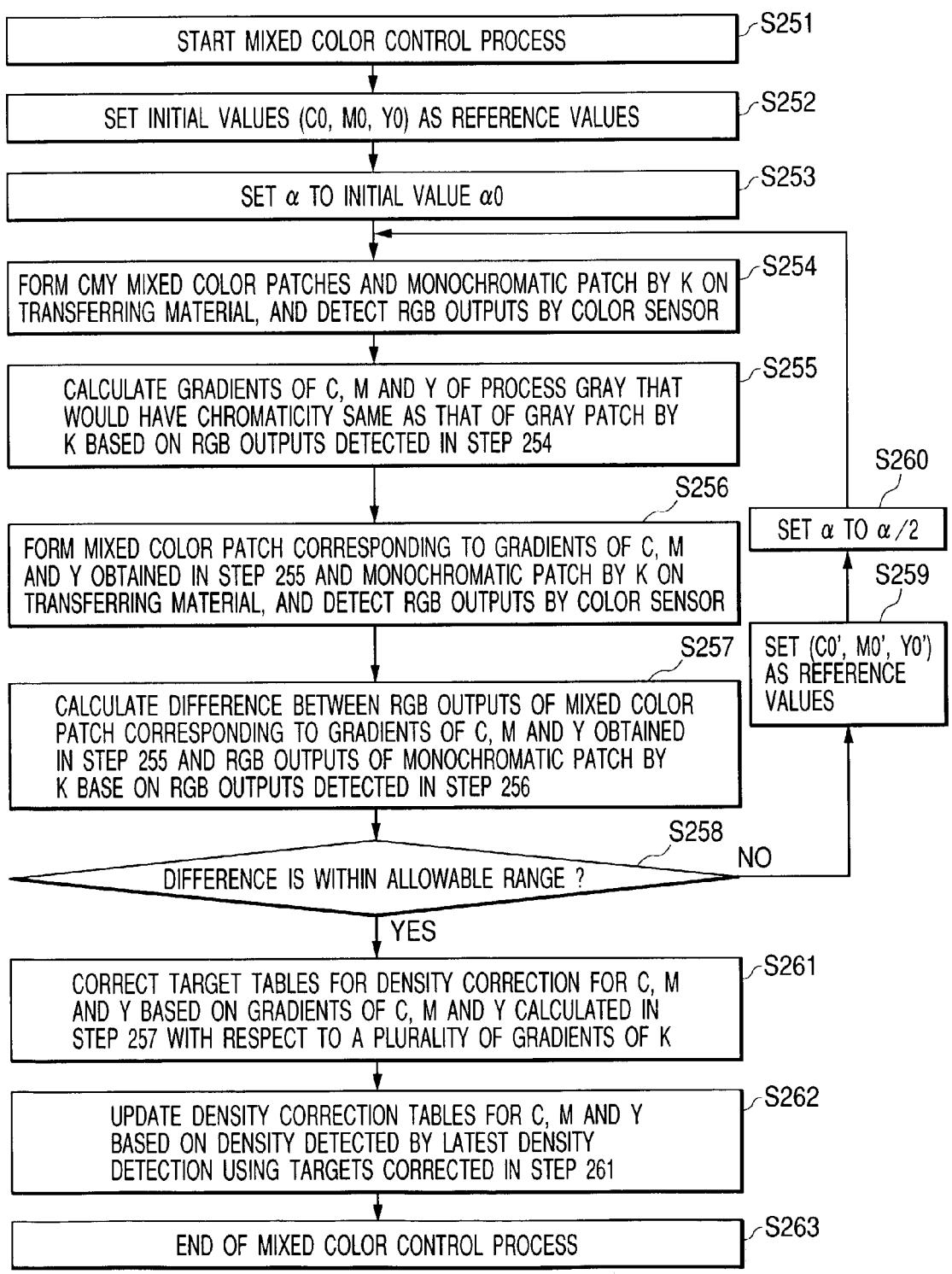
FIG. 28 is a flow chart specifically showing a mixed color control process in Embodiment 7.

The process flow in the present embodiment is the same as that in Embodiment 5 shown in the flow chart of FIGS. 15A and 15B except for the mixed color control process. FIG. 28 is a flow chart showing the mixed color control process in the present embodiment.

In step 251, the mixed color control process is started.

In step 252, gradients (C0, M0, Y0) of cyan (C), magenta (M) and yellow (Y) that have been determined in advance are set as reference values (Cs, Ms, Ys). The values (C0, M0, Y0) are determined in the manner same as in Embodiment 5.

In step 253, the value of $\alpha$ is set to an initial value $\alpha 0$. As the density correction tables for C, M, Y and K, tables that have been created by a density control process in the monochromatic control process (not shown in FIG. 28) are used.

Figure 20:
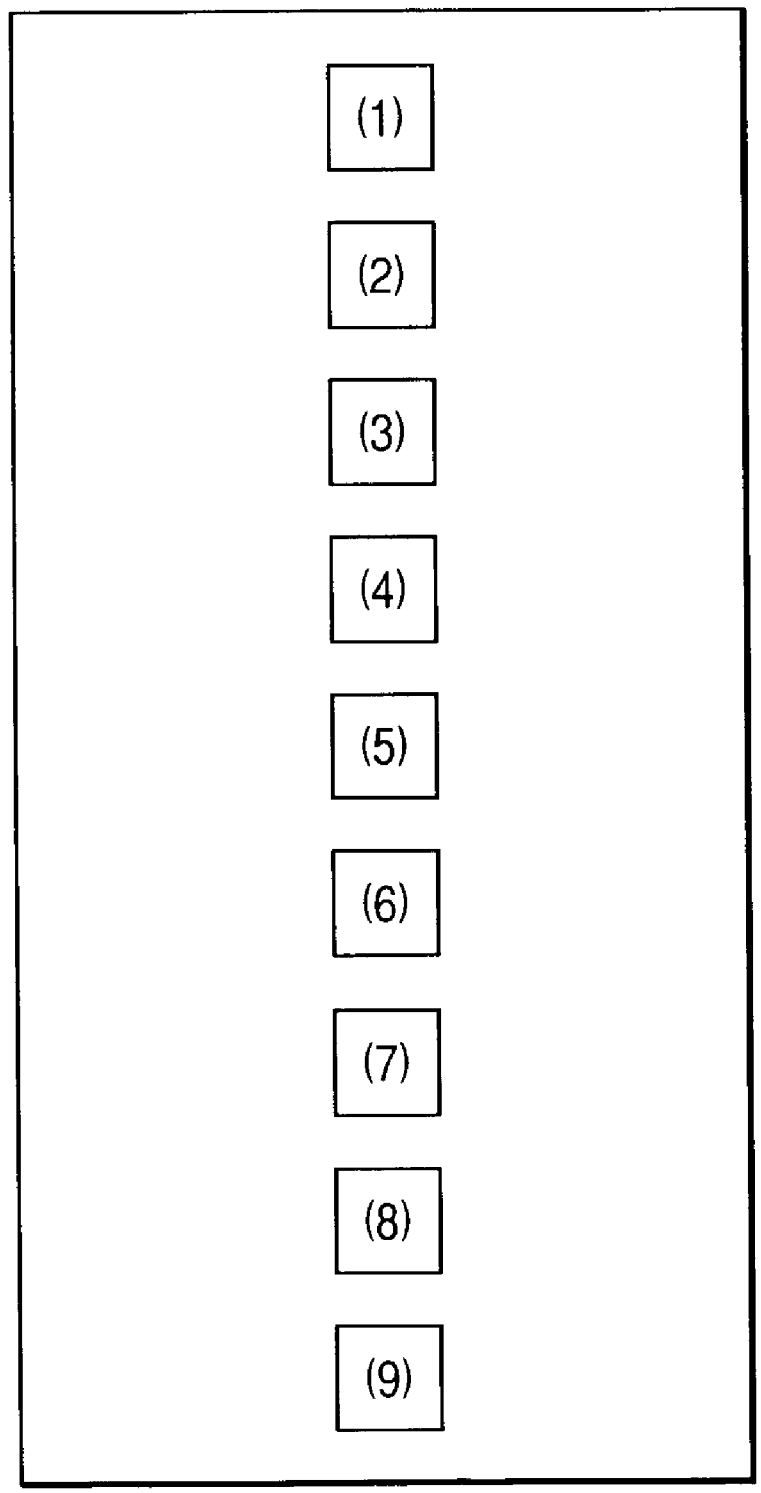
FIG. 20 illustrates the patch pattern to be formed on the transferring material.
Figures 29, 30:
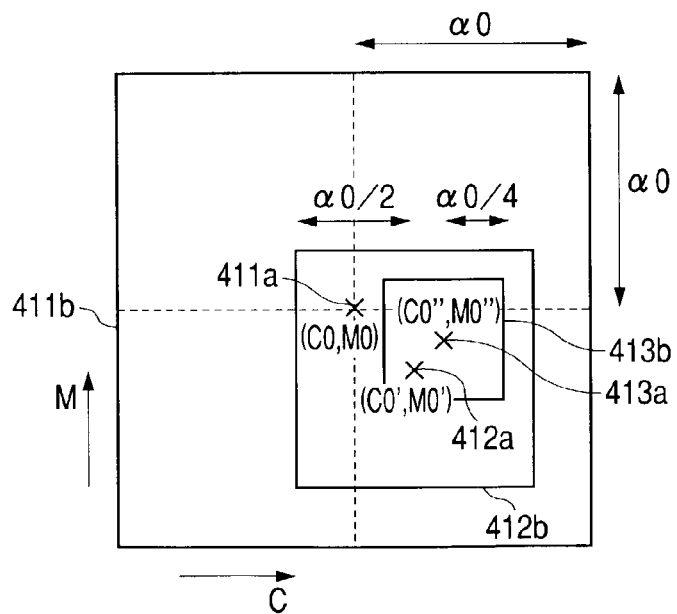
FIG. 29 is a table showing data of a patch pattern formed on a transferring material.
FIG. 30 is a diagram illustrating a mixed color control process in Embodiment 7.

In step 254, a patch pattern including mixed color patches formed by cyan (C), magenta (M) and yellow (Y) and a monochromatic patch formed by black (K) is formed on a transferring material. FIG. 29 shows a table of the data of the patch pattern in this embodiment. The values of C, M and Y in each of the patches are set as a combination of values Cs±$\alpha$, Ms±$\alpha$ and Ys±$\alpha$, that is, the values varied from the reference values Cs, Ms and Ys by ±$\alpha$. The patch (9) is the monochrome black (K) patch, which is formed with a predetermined gradient K0. The patch pattern formed on the transferring material includes patches (1) to (9) as shown in FIG. 20, like in Embodiment 5. The patches on the transferring material are detected, after their passing through the fixing unit 30, by the color sensor 42, so that RGB values are output.

In step 255, optimum values (C0', M0', Y0') are determined by a method similar to the corresponding process in Embodiment 5.

In step, 256, a mixed color patch is formed again on a transferring material using the values (C0', M0', Y0') obtained in step 255. At that time, a monochromatic patch by K is also formed. The patches formed on the transferring material are detected by the color sensor 42 after their passing through the fixing unit 30, and RGB values are output.

In step 257, a difference between the RGB values of the mixed color patch by (C0', M0', Y0') and the RGB values of the monochromatic patch by K0 output in step 256 is calculated as, for example, a sum of squares of differences.

In step 258, it is determined whether or not the difference obtained in step 257 is larger than a predetermined threshold value. When it is determined that the difference is larger than the threshold, the process proceeds to step 259 since the difference is beyond an allowable range.

In step 259, the values (C0', M0', Y0') obtained by the calculation in step 255 are set as the reference values (Cs, Ms, Ys).

In step 260, the value of $\alpha$ is set to the half (½) of $\alpha$ that was used in steps 254 and 255.

Then again in step 254, a patch pattern including mixed color patches by C, M and Y and a monochrome patch by K is formed using the new (or updated) reference values and the new value of $\alpha$, and RGB values thereof are detected by the color sensor.

The process according to steps 254 to 260 described above is repeated while updating the reference values (Cs, Ms, Ys) and $\alpha$ until it is determined in step 258 that the difference falls within the allowable range.

FIG. 30 is a schematic diagram illustrating a method for searching the optimum values in the process of steps 254 to 260. In FIG. 30, the coordinate representing yellow (Y) is omitted for the sake of simplicity, and the coordinates representing cyan (C) and magenta (M) are shown. In FIG. 30, in which the abscissa represents C and the ordinate represents M, the position of coordinates (C0, M0) that are set as initial values is denoted by reference numeral 411a. When the mixed color control process is started, four patches corresponding to the coordinates of the four corners of a rectangle 411b that bounds (or borders) the area extending from the center (C0, M0) by ±$\alpha 0$ in the direction of the coordinate axes of M and C are first formed (steps 252 to 254). Then the coordinates (C0', M0') 412a for C and M with which the sensor output values closest to those of K0 would be obtained are calculated using an interpolation based on the sensor output values with respect to these patches (step 255). Next, in steps 256 to 257, a patch corresponding to (C0', M0') and a patch corresponding to K0 are formed. Then it is determined whether or not the difference between the sensor outputs values of these patches is within an allowable range (step 258).

When the difference is not within the allowable range, a second set of patches corresponding to the coordinates of the four corners of a rectangle 412b that bounds the area extending from the center 412a by ±$\alpha 0/2$ in the direction of the coordinate axes of M and C are formed (steps 259 to 254). Then again, the coordinates (C0", M0") 413a for C and M with which the sensor output values closest to those of K0 would be obtained are calculated using an interpolation based on the sensor output values with respect to these patches (step 255).

Next, in steps 256 to 257, a patch corresponding to (C0", M0") and a patch corresponding to K0 are formed. Then it is determined whether or not the difference between the sensor outputs values of these patches is within the allowable range (step 258). When the difference is not within the allowable range, a third set of patches corresponding to the coordinates of the four corners of a rectangle 413b that bounds the area extending from the center 413a by ±$\alpha 0/4$ in the direction of the coordinate axes of M and C are formed (steps 259 to 254). Then again, the coordinates (C0''', M0''') for C and M with which the sensor output values closest to those of K0 would be obtained are calculated using an interpolation based on the sensor output values with respect to those patches (step 255).

The above process is repeated while narrowing the area in the diagram in FIG. 30 so that optimum values for C, M and Y would be obtained.

When it is determined in step 258 that the difference is smaller than the threshold value, the values of C, M and Y obtained in step 255 are set as the optimum values since the difference is within the allowable range. In steps 261 to 262, the process same as that in steps 216 to 217 of Embodiment 5 is performed.

In the process described above, only one set of the reference values (Cs, Ms, Ys) is used, but the process may be arranged to form a plurality of sets of patches corresponding to (CN, MN, YN) with respect to a plurality of values KN (N=0, 1, . . . ,n) for K. In that case, the loop of steps 254 to 260 may be repeated only for the patches that correspond to values (CN, MN, YN) that are not fall within the allowable range.

In order to suppress consumption of the transferring materials and to reduce the number of times of forming the patches, upon forming the mixed color patch in step 256, the mixed color patch to be formed in step 254 may be formed at the same time on the assumption that step 258 may be answered in the negative.

Embodiment 8

The structure of the color image forming apparatus according to this embodiment is the same as that of Embodiment 1. The process flow in the present embodiment is the same as that in Embodiment 5 shown in the flow chart of FIGS. 15A and 15B. In the present embodiment, a multiple regression analysis is used in step 215 for obtaining optimum values.

First a description will be made of a patch pattern to be formed in step 214. Mixed color patches by cyan (C), magenta (M) and yellow (Y) and a monochromatic patch by black (K) correspond to data of C, M and Y (1) to (6) and data of monochromatic K (7) indicated in the table of FIG. 31. The value of each of gradients C00 to C05, M00 to M05 and Y00 to Y05 may be set, for example, to C0, M0 and Y0 respectively except that the gradient for one specific color is varied from the reference value by ±α, like in Embodiment 6. The patch (7) is the monochrome black (K) patch, which is formed with a predetermined gradient K0. The reference values C0, M0 and Y0 are such values with which mixed color corresponding to the combination of C0, M0 and Y0 would become the color same as the color corresponding to K0 under the condition in which the density characteristics of K are adjusted to the state of gradation-density curve 300 and the gradation-density curves of C, M and Y are typical. The patches (1) to (7) are formed on the transferring material in a manner shown in FIG. 26. The patches formed on the transferring material are detected, after their passing through the fixing unit 30, by the color sensor 42, so that RGB values are output.

Next, in step 236, values (i.e. gradients) of C, M and Y with which CMY process gray would coincide with the color of the K patch (7) are calculated based on the RGB outputs of the sensor.

Next, Coefficients $rc_0$, $rc_1$, $rc_2$ and $rc_3$ in the following multiple regression equation with respect to R is to be determined, wherein the gradients of C, M and Y are explanatory variables and R is a response variable:

$$R = rc_1 \times C + rc_2 \times M + rc_3 \times Y + rc_0.$$

In connection with this, the RGB output values of respective patches (1) to (6) are represented as (1): $(r_{00}, g_{00}, b_{00})$, (2): $(r_{01}, g_{01}, b_{01})$, . . . , and (6): $(r_{05}, g_{05}, b_{05})$, and the RGB output values of the monochrome K patch (7) are represented as $(rk_0, gk_0, bk_0)$. The Coefficients $rc_0$, $rc_1$, $rc_2$ and $rc_3$ are determined as follows.

Assuming:

$$S = \begin{pmatrix} S_{11} & S_{12} & S_{13} \\ S_{21} & S_{22} & S_{23} \\ S_{31} & S_{32} & S_{33} \end{pmatrix}, T = \begin{pmatrix} S_{R1} \\ S_{R2} \\ S_{R3} \end{pmatrix}, B = \begin{pmatrix} rc_1 \\ rc_2 \\ rc_3 \end{pmatrix},$$

where, $$S_{11} = \sum_{i=0}^{5} (C_{0i} - \overline{C_0})^2, \overline{C_0} = \frac{\sum_{i=0}^{5} C_{0i}}{6}$$

$$S_{22} = \sum_{i=0}^{5} (M_{0i} - \overline{M_0})^2, \overline{M_0} = \frac{\sum_{i=0}^{5} M_{0i}}{6}$$

$$S_{33} = \sum_{i=0}^{5} (Y_{0i} - \overline{Y_0})^2, \overline{Y_0} = \frac{\sum_{i=0}^{5} Y_{0i}}{6}$$

$$S_{12} = \sum_{i=0}^{5} (C_{0i} - \overline{C_0}) \times (M_{0i} - \overline{M_0})$$

$$S_{13} = \sum_{i=0}^{5} (C_{0i} - \overline{C_0}) \times (Y_{0i} - \overline{Y_0})$$

$$S_{23} = \sum_{i=0}^{5} (M_{0i} - \overline{M_0}) \times (Y_{0i} - \overline{Y_0})$$

$$S_{21} = S_{12}, S_{31} = S_{13}, S_{32} = S_{23}$$

$$S_{R1} = \sum_{i=0}^{5} (C_{0i} - \overline{C_0}) \times (r_{0i} - \overline{r_0}), \overline{r_0} = \frac{\sum_{i=0}^{5} r_{0i}}{6}$$

$$S_{R2} = \sum_{i=0}^{5} (M_{0i} - \overline{M_0}) \times (r_{0i} - \overline{r_0})$$

$$S_{R3} = \sum_{i=0}^{5} (Y_{0i} - \overline{Y_0}) \times (r_{0i} - \overline{r_0}),$$

then, $rc_1$, $rc_2$ and $rc_3$ are determined by the following equation:

$$B = S^{-1} T$$

and $rc_0$ is determined by the following equation:

$$rc_0 = \overline{r_0} - (rc_1 \times \overline{C_0} + rc_2 \times \overline{M_0} + rc_3 \times \overline{Y_0})$$

With respect to G and B, the coefficients in the following multiple regression equations are determined in the manner same as above:

$$G = gc_1 \times C + gc_2 \times M + gc_3 \times Y + gc_0,$$

$$B = bc_1 \times C + bc_2 \times M + bc_3 \times Y + bc_0.$$

Letting (C0', M0', Y0) be the values of C, M and Y corresponding to the output values $(rk_0, gk_0, bk_0)$ with respect to K, and substituting these values to the above equations, we obtain the following equation, which is written in a matrix form:

$$\begin{pmatrix} rk_0 \\ gk_0 \\ bk_0 \end{pmatrix} = \begin{pmatrix} rc_1 & rc_2 & rc_3 \\ gc_1 & gc_2 & gc_3 \\ bc_1 & bc_2 & bc_3 \end{pmatrix} \begin{pmatrix} C'_0 \\ M'_0 \\ Y'_0 \end{pmatrix} + \begin{pmatrix} rc_0 \\ gc_0 \\ bc_0 \end{pmatrix}$$

This equation can be changed into the following equation:

$$\begin{pmatrix} C'_0 \\ M'_0 \\ Y'_0 \end{pmatrix} = \begin{pmatrix} rc_1 & rc_2 & rc_3 \\ gc_1 & gc_2 & gc_3 \\ bc_1 & bc_2 & bc_3 \end{pmatrix}^{-1} \begin{pmatrix} rk_0 - rc_0 \\ gk_0 - gc_0 \\ bk_0 - bc_0 \end{pmatrix}$$

Thus, the values (C0', M0', Y0') are determined.

Furthermore, the gradient of K is varied and sets of patches (1) to (7) similar to the above patches having different reference values (CN, MN, YN, KN) (where, N=0, 1, 2, . . . , n) are formed, and values (CN', MN', YN', KN') corresponding to the respective values (CN, MN, YN, KN) are determined.

The process thereafter is the same as the process from step 216 onward in FIGS. 15A and 15B.

While in this embodiment the number of the patches and the values for the patches are set the same as those in Embodiment 6, the number and the values are not limited to those specific figures and they may be varied.

In this embodiment, a lattice as used in Embodiments 5 to 7 (shown in FIG. 21) is not assumed, so the number of the patches and the values for the patches can be selected relatively freely. Therefore, it is possible to obtain optimum values accurately irrespective of the relationship between the reference values and the values for the patches.

As per the above, according to Embodiments 5 to 8 of the present invention, color balance of cyan (C), magenta (M) and yellow (Y) can be matched with black (K) (i.e. achromatic color) in a high accuracy by forming a plurality of patches having different ratios of C, M and Y and performing interpolation based on them upon matching the gradation-density characteristics of C, M and Y with the gradation-density characteristics of K. Therefore, it is possible to provide a color image forming apparatus that has high color reproducibility in which the hue of images is unlikely to vary, even when environmental variations that would vary the density-gradation characteristics occur.

While the invention has been described with reference to some preferred embodiments, it is not confined to the details thereof and the invention covers such modifications or changes as may come within the scope of the attached claims.

What is claimed is:

1. A control method in an image forming apparatus which forms an image with an achromatic colorant and images with a plurality of chromatic colorants and superimposing those images to form a color image on a transfer sheet, wherein said method comprises the steps of:
    causing the image forming apparatus to form a plurality of gray patches by mixing a plurality of chromatic colorants while changing a mixture rate of the chromatic colorant in several ways;
    causing the image forming apparatus to form a gray patch with an achromatic colorant;
    detecting, by using a color sensor, a chromaticity of each of the gray patches thus formed;
    obtaining, by calculating based on a result of said detection of a plurality of gray patches with mixed chromatic colorants and a result of gray patch with an achromatic colorant, respective gradients of a gray with the plurality of chromatic colorants that would have the same chromaticity as the gray patch formed with the achromatic colorant; and
    controlling an image forming condition of respective chromatic colorants based on a result of said step of obtaining respective gradients of a gray.

2. A control method according to claim 1, wherein the achromatic colorant comprises black toner, and the chromatic colorants comprise yellow, magenta, and cyan toner.

3. A control method according to claim 1, wherein respective gray patches formed with a plurality of chromatic colorants are formed by setting an amount of one of the chromatic colorants to a reference value plus or minus a specific variation and fixing an amount of the other chromatic colorants to respective reference values.

4. A control method according to claim 3, wherein the reference value and the specific variation are determined based on a result of the latest detecting step.

5. A control method according to claim 4, wherein immediately after a cartridge of any colorant is replaced, the reference values and the specific variations are set to predetermined values.

6. A control method according to claim 1, wherein said step of causing the image forming apparatus to form a plurality of gray patches, said step of causing the image forming apparatus to form a gray patch and said step of detecting chromaticity of each of the gray patches are repeatedly performed until a difference between a gray patch formed by mixing a plurality of chromatic colorants and a gray patch formed of an achromatic colorant is achieved.

7. A control method according to claim 1, wherein, in said step of obtaining respective gradients of a gray], a linear interpolation calculation is used.

8. A control method according to claim 1, wherein in said step of obtaining respective gradients of a gray], a non-linear interpolation calculation is used.

9. A control method according to claim 1, wherein, in said step of obtaining respective gradients of a gray], a multiple regression analysis is used,
    wherein the amounts of respective colorant are explanatory variables and the detected chromaticity is a response variable.

10. A control method according to claim 1, wherein the image forming apparatus comprises:
    a primary transfer unit adapted to superimpose toner images with respective colorants on an intermediate transferring member;
    a secondary transfer unit adapted to transfer a toner image on the intermediate transferring medium onto a transferring sheet; and
    a fixing unit adapted to fixing a toner image on the transferring sheet.

11. A control method according to claim 10, wherein the color sensor detects a chromaticity of the fixed toner image on the transfer sheet.

12. A control method according to claim 1, said method further comprising the step of:
    causing the image forming apparatus to form a patch;
    detecting, by using a density sensor, a density of a formed patch, wherein the formed patch has not yet been transferred to a transfer sheet; and
    controlling an image forming condition based on a result of the detection by the density sensor.

13. An image forming apparatus comprising:
an image forming unit adapted to form an image with an achromatic colorant, and to form images by mixing a plurality of chromatic colorants, and to superimpose those images to form a color image on a transfer sheet;
a color sensor adapted to detect a chromaticity of a plurality of gray patches formed by mixing a plurality of chromatic colorants while changing a mixing rate of the respective chromatic colorants in several ways and to detect a gray patch with an achromatic colorants;
a controller adapted to obtain, by calculating a result of detection of a plurality of gray patches with mixed chromatic colorants and a result of detection of gray patch with an achromatic colorant, respective gradients of a gray with the plurality of chromatic colorants that would have the same chromaticity as the gray patch formed with the achromatic colorant, and to control an image forming condition of respective chromatic colorants based on the obtained result.

14. An image forming apparatus according to claim 13, wherein the achromatic colorant comprises black toner, and the chromatic colorants comprise] yellow, magenta, and cyan toner.

15. An image forming apparatus according to claim 13, further comprising:
a primary transfer unit adapted to superimpose toner images by respective colorants on an intermediate transferring member;
a secondary transfer unit adapted to transfer a toner image on the intermediate transferring medium onto a transferring sheet; and
a fixing unit adapted to fixing a toner image on the transferring sheet.

16. An image forming apparatus according to claim 15, wherein said color sensor detects chromaticity of the fixed toner image on the transfer sheet.

17. An image forming apparatus according to claim 13, further comprising a density sensor adapted to detect a density of a formed patch which has not yet been transferred to a transfer sheet, and for controlling an image forming condition.

* * * * *

UNITED STATES PATENT AND TRADEMARK OFFICE
CERTIFICATE OF CORRECTION

| | |
|---|---|
| PATENT NO. | : 7,097,270 B2 |
| APPLICATION NO. | : 10/253508 |
| DATED | : August 29, 2006 |
| INVENTOR(S) | : Hiroyuki Yamazaki |

It is certified that error appears in the above-identified patent and that said Letters Patent is hereby corrected as shown below:

SHEET 24:

Figure 24A, "(CO'," should read --(C0',--.

COLUMN 1:

Line 46, "etc" should read --etc.--; and
    Line 60, "an" should read --a--.

COLUMN 2:

Line 26, "provide" should read --provided--.

COLUMN 7:

Line 28, "sown" should read --shown--.

COLUMN 8:

Line 16, "after fixed" should read --after fixation--.

COLUMN 10:

Line 1, "on" should read --of--.

COLUMN 13:

Line 23, "and fixed is produced" should read --after fixation--.

COLUMN 14:

Line 44, "relative" should read --relative to--.

COLUMN 25:

Line 59, "step, 256," should read --step 256,--.

UNITED STATES PATENT AND TRADEMARK OFFICE
CERTIFICATE OF CORRECTION

PATENT NO. : 7,097,270 B2
APPLICATION NO. : 10/253508
DATED : August 29, 2006
INVENTOR(S) : Hiroyuki Yamazaki It is certified that error appears in the above-identified patent and that said Letters Patent is hereby corrected as shown below:

COLUMN 27:

Line 16, "are" should read --do--.

COLUMN 30:

Line 36, "gray]," should read --gray,--;
Line 39, "gray]," should read --gray,--;
Line 42, "gray]," should read --gray,--; and
Line 61, "step" should read --steps--.

COLUMN 31:

Line 10, "an" should be deleted; and
Line 22, "comprise]" should read --comprise--.

Signed and Sealed this

Third Day of April, 2007

JON W. DUDAS
*Director of the United States Patent and Trademark Office*